(12) United States Patent
Iwasaki et al.

(10) Patent No.: US 10,634,058 B2
(45) Date of Patent: Apr. 28, 2020

(54) COOLING SYSTEM FOR GAS TURBINE, GAS TURBINE EQUIPMENT PROVIDED WITH SAME, AND PARTS COOLING METHOD FOR GAS TURBINE

(71) Applicant: MITSUBISHI HITACHI POWER SYSTEMS, LTD., Kanagawa (JP)

(72) Inventors: Yoshifumi Iwasaki, Yokohama (JP); Toshishige Ai, Yokohama (JP); Yuya Fukunaga, Yokohama (JP); Tatsuya Iwasaki, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 368 days.

(21) Appl. No.: 15/545,072

(22) PCT Filed: Jan. 25, 2016

(86) PCT No.: PCT/JP2016/052000
§ 371 (c)(1),
(2) Date: Jul. 20, 2017

(87) PCT Pub. No.: WO2016/121684
PCT Pub. Date: Aug. 4, 2016

(65) Prior Publication Data
US 2018/0010520 A1    Jan. 11, 2018

(30) Foreign Application Priority Data

Jan. 30, 2015    (JP) .................................. 2015-016717

(51) Int. Cl.
*F02C 7/18*    (2006.01)
*F01D 25/12*    (2006.01)
(Continued)

(52) U.S. Cl.
CPC .............. *F02C 7/185* (2013.01); *F01D 5/187* (2013.01); *F01D 9/041* (2013.01); *F01D 25/12* (2013.01);
(Continued)

(58) Field of Classification Search
CPC .... F01D 25/12; F02C 6/08; F02C 7/18; F02C 7/185; F02C 9/18
See application file for complete search history.

(56) References Cited

U.S. PATENT DOCUMENTS

| 6,615,574 | B1 | 9/2003 | Marks |
| 2008/0310955 | A1* | 12/2008 | Norris ....................... F02C 7/14 415/178 |

(Continued)

FOREIGN PATENT DOCUMENTS

| CN | 101946073 | 1/2011 |
| CN | 104204467 | 12/2014 |

(Continued)

OTHER PUBLICATIONS

International Search Report dated Apr. 26, 2016 in International (PCT) Application No. PCT/JP2016/052000, with English translation.

(Continued)

*Primary Examiner* — Scott J Walthour
(74) *Attorney, Agent, or Firm* — Wenderoth, Lind & Ponack, L.L.P.

(57) ABSTRACT

A cooling system includes: a high pressure bleed line configured to bleed high pressure compressed air from a first bleed position of a compressor and to send the air to a first hot part; a low pressure bleed line configured to bleed low pressure compressed air from a second bleed position of the compressor and to send the air to a second hot part; an orifice provided in the low pressure bleed line; a connecting line (Continued)

configured to connect the high pressure bleed line and the low pressure bleed line; a first valve provided in the connecting line; a bypass line configured to connect the connecting line and the low pressure bleed line; and a second valve provided in the bypass line.

20 Claims, 12 Drawing Sheets

(51) Int. Cl.
    *F02C 6/08*       (2006.01)
    *F02C 9/18*       (2006.01)
    *F01D 5/18*       (2006.01)
    *F01D 9/04*       (2006.01)
    *F02C 3/06*       (2006.01)

(52) U.S. Cl.
    CPC .................. *F02C 6/08* (2013.01); *F02C 9/18* (2013.01); *F02C 3/06* (2013.01); *F05D 2220/32* (2013.01); *F05D 2240/35* (2013.01); *F05D 2260/211* (2013.01); *F05D 2260/606* (2013.01); *F05D 2270/112* (2013.01); *F05D 2270/303* (2013.01)

(56) References Cited

U.S. PATENT DOCUMENTS

| | | | |
|---|---|---|---|
| 2009/0104020 A1* | 4/2009 | Roush | F02C 6/08 |
| | | | 415/145 |
| 2010/0154434 A1 | 6/2010 | Kubota et al. | |
| 2011/0135456 A1* | 6/2011 | Takahashi | F01D 11/24 |
| | | | 415/180 |
| 2015/0027129 A1 | 1/2015 | Franitza et al. | |
| 2016/0326878 A1 | 11/2016 | Morimoto et al. | |
| 2017/0167273 A1* | 6/2017 | Maguire | F01D 5/187 |

FOREIGN PATENT DOCUMENTS

| | | |
|---|---|---|
| EP | 2 309 108 | 4/2011 |
| JP | 2010-38071 | 2/2010 |
| JP | 2013-40567 | 2/2013 |
| JP | 2013-57278 | 3/2013 |
| JP | 2015-145644 | 8/2015 |
| WO | 2013/144111 | 10/2013 |

OTHER PUBLICATIONS

Written Opinion of the International Searching Authority dated Apr. 26, 2016 in International (PCT) Application No. PCT/JP2016/052000, with English translation.

* cited by examiner

COOLING SYSTEM FOR GAS TURBINE, GAS TURBINE EQUIPMENT PROVIDED WITH SAME, AND PARTS COOLING METHOD FOR GAS TURBINE

TECHNICAL FIELD

The present invention relates to a cooling system for a gas turbine which cools a hot part of the gas turbine, gas turbine equipment provided with the same, and a parts cooling method for a gas turbine.

Priority is claimed on Japanese Patent Application No. 2015-016717, filed Jan. 30, 2015, the content of which is incorporated herein by reference.

BACKGROUND ART

A gas turbine includes a compressor configured to compress atmospheric air to generate compressed air, combustors configured to burn a fuel in the compressed air to generate a combustion gas, and a turbine driven using the combustion gas. Hot parts coming into contact with the high temperature combustion gas among parts constituting the gas turbine need to be cooled using any method to improve their durability. Examples of hot parts include vanes, blades, and the like of the turbine.

The following Patent Document 1 discloses a cooling system configured to cool a hot part of a gas turbine using air bled from a compressor. This cooling system includes a rotor cooling air line (a high pressure bleed line) configured to send air to blades in a turbine rotor, a vane cooling air line (a low pressure bleed line) configured to send air to vanes in a turbine, and a communicating line (a connecting line) configured to connect the rotor cooling air line and the vane cooling air line. The rotor cooling air line bleeds air from a first bleed position of a compressor and sends the air to the blades in the turbine rotor constituting some of hot parts. The vane cooling air line bleeds air at a pressure lower than that of the air winch is bled from the first bleed position from a second bleed position of the compressor and sends the air to the vanes in the turbine. A cooler configured to cool air passing through the rotor cooling air line is provided at a position in the rotor cooling air line closer to the first bleed position side than a position of connection with the communicating line. A control valve configured to adjust a flow rate of air flowing through the vane cooling air line is provided at a position in the vane cooling air line closer to the vane side than a position of connection with the communicating line. A control valve configured to adjust a flow rate of air flowing through the communicating line is provided in the communicating line.

In this cooling system, the control valve provided in the communicating line is opened so that high pressure air bled from the first bleed position and cooled by the cooler can flow into the vane cooling air line.

CITATION LIST

Patent Document

[Patent Document 1]

Japanese Unexamined Patent Application, First Publication No. 2010-038071 (FIG. 11)

SUMMARY OF INVENTION

Technical Problem

An objective of the present invention is to provide a cooling system for a gas turbine which can appropriately supply cooling air to a hot part, and gas turbine equipment provided with the same.

Solution to Problem

A cooling system for a gas turbine as a first aspect according to the invention for the purpose of accomplishing the above-described objective is a cooling system for a gas turbine which includes a compressor configured to compress air, a combustor configured to burn a fuel in the air compressed by the compressor to generate a combustion gas, and a turbine driven using the combustion gas, the cooling system for a gas turbine including: a high pressure bleed line configured to bleed air from a first bleed position of the compressor and to send the air bled from the first bleed position to a first hot part coming into contact with the combustion gas among parts constituting the gas turbine; a cooler configured to cool air passing through the high pressure bleed line; a low pressure bleed line configured to bleed air at a pressure lower than that of the air which is bled front the first bleed position from a second bleed, position of the compressor and to send the air bled tram the second bleed position to a second hot part coming into contact with the combustion gas and disposed under a lower pressure environment than the first hot part among the parts constituting the gas turbine: a minimum flow rate securing device configured to secure a minimum flow rate of air flowing through the low pressure bleed line while limiting a flow rate of the air flowing through the low pressure bleed line; a connecting line configured to connect a position in the high pressure bleed line closer to the first hot part side than the cooler and a position in the low pressure bleed line closer to the second bleed position sale than the minimum flow rate securing deuce, a first valve provided in the connecting line; a bypass line configured to connect a position in the connecting line closer to fee low pressure bleed line side than the first valve and a position in the low pressure bleed line closer to the second hot part side than the minimum flow rate securing device; and a second valve provided in the bypass line.

According to the cooling system, opening and closing of the first valve is controlled so that the air bled from the first bleed position and cooled by the cooler can flow into the low pressure bleed line via the connecting line. For this reason, in the cooling system, a temperature of cooling air for the purpose of cooling the second hot parts can be adjusted even when the cooler is not provided in the low pressure bleed line. Furthermore, in the cooling system, opening and closing of the second valve can be controlled so that the cooling air can be supplied to the second, hot parts via the low pressure bleed line, a flow rate of which is limited using the minimum flow rate securing device, as well as via the bypass line. For this reason, in the cooling system, opening and closing of the second valve is controlled so that a flow rate of cooling air supplied to the second hot parts can be adjusted. In other words, in the cooling system, the temperature and the flow rate of the cooling air supplied to the second hot parts can be adjusted.

Also, according to the cooling system, low pressure compressed air from the second bleed position can be supplied to the second hot parts as the cooling air via the minimum flow rate securing device in the low pressure bleed line even when both of the first valve and the second valve fail in a closed state. For this reason, in the cooling system, the second hot parts, can be prevented from being immediately damaged due to heat even when both of the first valve and the second valve fail in the closed state. Moreover, in the cooling system, since a flow rate of low pressure compressed air flowing through the low pressure bleed line is limited using the minimum flow rate securing device, an increase in amount of bleeding from the compressor can be suppressed, so that a decrease in gas turbine output can be suppressed even when both of the first valve and the second valve fail in the closed state.

According to a cooling system for a gas turbine as a second aspect according to the invention for the purpose of accomplishing the above-described objective, in the cooling system for a gas turbine according to the first aspect, the cooling system for a gas turbine may include; a first control unit configured to control the degree of valve opening of the first valve; and a second control unit configured to control the degree of valve opening of the second valve, wherein the first control unit may control the degree of valve opening of the first valve on the basis of at least one parameter value of an intake temperature that is a temperature of air suctioned by the compressor and an output correlation value that is a gas turbine output or a value correlated with the gas turbine output, and the second control unit may control the degree of valve opening of the second valve on the basis of the parameter value.

The temperature and the flow rate of low pressure compressed air bled from the second bleed position change along with a change in the output correlation value. Furthermore, the temperature and the flow rate of the low pressure compressed air bled from the second bleed position change along with a change hi the intake temperature. For this reason, the degrees of valve opening of the valves are controlled on the basis of at least one parameter value of the output correlation value and the intake temperature so that a temperature and a flow rate of the cooling air supplied to the second hot parts can be adjusted to appropriate values.

A cooling system for a gas turbine as a third aspect according to the invention for the purpose of accomplishing the above-described objective is a cooling system for a gas turbine which includes a compressor configured to compress air, a combustor configured to burn a fuel in the air compressed by the compressor to generate a combustion gas, and a turbine driven using the combustion gas, the cooling system for a gas turbine including: a high pressure bleed line configured to bleed air from a first bleed position of the compressor and to send the air bled from the first bleed position to a first hot part coming into contact with the combustion gas among parts constituting the gas turbine; a cooler configured to cool air passing through the high pressure bleed line; a low pressure bleed line configured to bleed air at a pressure lower than that of the air which is bled from the first bleed position from a second bleed position of the compressor and to send the air bled from the second bleed position to a second hot part coming into contact with the combustion gas and disposed under a lower pressure environment than the first hot part among the parts constituting the gas turbine; a connecting line configured to connect a position in the high pressure bleed line closer to the first hot part side than the cooler and the low pressure bleed line; a first valve provided in the connecting line; a second valve provided at a position in the high pressure bleed line closer to the first hot part side than a position of connection with the connecting line; a first control unit configured to control a degree of valve opening of the first valve; and a second control unit configured to control a degree of valve opening of the second valve, wherein the first control unit controls the degree of valve opening of the first valve on the basis of at least one parameter value of an intake temperature that is a temperature of air suctioned by the compressor and an output correlation value that is a gas turbine output or a value correlated with the gas turbine output, and the second control unit controls the degree of valve opening of the second valve on the basis of the parameter value.

Also in the cooling system, opening and closing of the first valve is controlled so that air bled from the first bleed position and cooled by the cooler can flow into the low pressure bleed line via the connecting line. For this reason, in the cooling system, a temperature of cooling air for the purpose of cooling the second hot parts can be adjusted even when the cooler is not provided in the low pressure bleed line. Furthermore, in the cooling system, opening and closing of the second valve is controlled so that a flow rate of cooling air supplied to the second hot parts can be adjusted. In other words, the temperature and the flow rate of the cooling air supplied to the second hot parts can be adjusted in the cooling system as well.

As described above, the temperature and the flow rate of low pressure compressed air bled from the second bleed position change along with a change in the output correlation value. Furthermore, the temperature and the flow rate of the low pressure compressed air bled from the second bleed position change along with a change in the intake temperature. For this reason, the degrees of valve opening of the valves are controlled on the basis of at least one parameter value of the output correlation value and the intake temperature so that the temperature and the flow rate of the cooling air supplied to fee second hot parts can be adjusted to appropriate values in the cooling system as well.

According to a cooling system for a gas turbine as a fourth aspect according to the invention far the purpose of accomplishing the above-described objective, in the cooling system for a gas turbine according to the second or third aspect; the parameter value may include the intake temperature, and when the intake temperature has become equal to or higher than a predetermined temperature, the first control unit may output, to the first valve, a control signal according to a degree of valve opening which is equal to or greater than the degree of valve opening of the first valve at a value of the intake temperature smaller than the predetermined temperature.

According to a cooling system for a gas turbine as a fifth aspect according to the invention tor the purpose of accomplishing the above-described objective, in the cooling system for a gas turbine according to the fourth aspect, the first control unit may receive a temperature near the second hot part, and when the temperature has become equal to or higher than a predetermined temperature, the first control unit may output a control signal according to a degree of valve opening which is open to the first valve.

According to a cooling system for a gas turbine as a sixth aspect according to the invention for the purpose, of accomplishing the above-described objective, in the cooling system for a gas turbine according to any one of the second to fifth aspects, the parameter value may include the output correlation value, and when the output correlation value has become equal to or greater than a predetermined correlation value, the first control unit may output, to the first valve, a control signal according to a degree of valve opening which is equal to or greater than the degree of valve opening of the first valve at a value of the output correlation value smaller than the predetermined correlation value.

According to a cooling system (or a gas turbine as a seventh aspect according to the invention for the purpose of accomplishing the above-described objective, in the cooling system for a gas turbine according to any one of the second to fifth aspects, the parameter value may include the output correlation value, and when the output correlation value has become equal to or less than a predetermined correlation value, the first control unit may output, to the first valve, a control signal according to a degree of valve opening which is equal to or greater than the degree of valve opening of the first valve at a value of the output correlation value larger than the predetermined correlation value.

According to a cooling system for a gas turbine as an eighth aspect according to the invention for the purpose of accomplishing the above-described objective, in the cooling system for a gas turbine according to any one of the second to seventh aspects, the parameter value may include the intake temperature, and when the intake temperature has become equal to or lower than a predetermined temperature, the second control unit may output, to the second valve, a control signal according to a degree of valve opening which is equal to or greater than the degree of valve opening of the second valve at a value of the intake temperature larger than the predetermined temperature.

According to a cooling system for a gas turbine as a ninth aspect according to the invention for the purpose of accomplishing the above-described objective, in the cooling system for a gas turbine in the eighth aspect, when the intake temperature has reached a temperature between a first temperature that is the predetermined temperature and a second temperature higher than the first temperature, the second control unit may output a control signal according to a constant degree of valve opening to the second valve regardless of a change in the intake temperature, and when the intake temperature has become equal to or higher than the second temperature, the second control unit may output, to the second valve, a control signal according to a degree of valve opening which is equal to or less than the degree of valve opening of the second valve at a value of the intake temperature smaller than the second temperature.

According to a cooling system for a gas turbine as a tenth aspect according to the invention for the purpose of accomplishing the above-described objective, in the cooling system for a gas turbine in the eighth or ninth aspect, the second control unit may receive a temperature near the second hot part, and when the temperature has become equal to or higher than a predetermined temperature, the second control unit may output a control signal, according to a degree of valve opening which is open to the second valve.

According to a cooling system for a gas turbine as an eleventh aspect according to the invention for the purpose of accomplishing the above-described objective, in the cooling system for a gas turbine according to any one of the second to tenth aspects, the parameter value may include the output con-elation value, and when the output correlation value has become equal to or less than a predetermined correlation value, the second control unit may output, to the second valve, a control signal according to a degree of valve opening which is equal to or greater than the degree of valve opening of the second valve at a value of the output correlation value larger than the predetermined correlation value.

According to a tooling system for a gas turbine as a twelfth aspect according to the invention for the purpose of accomplishing the above-described objective, in the cooling system for a gas turbine according to any one of the first to eleventh aspects, the low pressure bleed line may be connected to a turbine vane that is the second hot part.

Gas turbine equipment as a thirteenth aspect according to the invention for the purpose of accomplishing the above-described objective includes the cooling system for a gas turbine according to any one of the first to twelfth aspects; and the gas turbine.

A parts cooling method for a gas turbine as a fourteenth aspect according to the invention for the purpose of accomplishing the above-described objective is a parts cooling method for a gas turbine which includes a compressor configured to compress air, a combustor configured to burn a fuel in the air compressed by the compressor and to generate a combustion gas, and a turbine driven using the combustion gas, the parts cooling method for a gas turbine including: a high pressure bleeding step of bleeding air from a first bleed position of the compressor as first air and sending the first air to a first hot part corning into contact with the combustion gas among parts constituting the gas turbine; a cooling step of cooling the first air sent to the first hot part in the high pressure bleeding step; a low pressure bleeding step of bleeding second air at a pressure lower than that of the first air from a second bleed position of the compressor and sending the second air to a second hot part coming into contact with the combustion gas and disposed under a lower pressure environment than the first hot part among the parts constituting the gas turbine; a mixing step of mixing the first air cooled in the cooling step into the second air sent to the second hot part; a first control step of controlling a degree of valve opening of a first valve to control the flow rate of the first air mixed into the second air; and a second control step of controlling a degree of valve opening of a second valve to control the flow rate of parts inflow air that is air combining the first air, the flow rate of which is controlled in the first control step and winch is mixed or has been mixed into the second air, and the second air, wherein, in the first control step, the flow rate of the first air mixed into the second air is controlled on the basis of at least one parameter value of an intake temperature that is a temperature of air suctioned by the compressor and an output correlation value that is a gas turbine output or a value correlated with the gas turbine output, and in the second control step, the flow rate of the parts inflow air is controlled on the basis of the parameter value.

According to the parts cooling method, opening and closing of the first valve is controlled so that air bled from the first bleed position and cooled by the cooler can be mixed into the second air sent to the second hot parts. For this reason, in the parts cooling method, a temperature of cooling air for the purpose of cooling the second hot parts can be adjusted even when the cooler is not provided to cool the second air. Furthermore, in the parts cooling method, opening and closing of the second valve is controlled so that a flow rate of cooling air supplied to the second hot parts can be adjusted. In other words, in the parts cooling method, a temperature and a flow rate of the cooling air supplied to the second hot parts can be adjusted.

As described above, a temperature and a flow rate of low pressure compressed air bled from the second bleed position change along with a change in the output correlation value. Furthermore, the temperature and the flow rate of the low pressure compressed air bled from the second bleed position change along with a change in the intake temperature. For this reason, the degrees of valve opening of the valves are controlled on the basis of at least one parameter value of the output correlation value and the intake temperature so that the temperature and the flow rate of cooling air supplied to the second hot parts can be adjusted to appropriate values in the parts cooling method as well.

According to a parts cooling method for a gas turbine as a fifteenth aspect according to the invention for the purpose of accomplishing the above-described objective, in the parts cooling method for a gas turbine according to the fourteenth aspect, the parameter value may include the intake temperature, and in the first control step, when the intake temperature has become equal to or higher than a predetermined temperature, a control signal according to a degree of valve opening which is equal to or greater than the degree of valve opening of the first valve at a value of the intake temperature smaller than the predetermined temperature may be output to the first valve.

According to a parts cooling method for a gas turbine as a sixteenth aspect according to the invention for the purpose of accomplishing the above-described objective, in the parts cooling method for a gas turbine according to the fifteen aspect, the parameter value may include the output correlation value, and hi the first, control step, when the output correlation value has become equal to or greater than a predetermined correlation value, a control signal according to a degree of valve opening which is equal to or greater than the degree of valve opening of the first valve at a value of the output correlation value smaller than the predetermined correlation value may be output to the first valve.

According to a parts cooling method for a gas turbine as a seventeenth aspect according to the invention for the purpose of accomplishing the above-described objective, in the parts cooling method for a gas turbine according to the fifteenth aspect, the parameter value may include the output correlation value, and in the first control step, when the output correlation value has become equal to or less than a predetermined correlation value, a control signal according: to a degree of valve opening which is equal to or greater than the degree of valve opening of the first valve at a value of the output correlation value larger than the predetermined correlation value may be output to the first valve.

According to a parts cooling method for a gas turbine as an eighteenth aspect according to the invention for the purpose of accomplishing the above-described objective, in the parts cooling method for a gas turbine according to any one of the fifteenth to seventeenth aspects, the parameter value may include the intake temperature, and in the second control step, when the intake temperature has become equal to or lower than a predetermined temperature, a control signal according to a degree of valve opening which is equal to or greater than the degree of valve opening of the second valve at a value of the intake temperature larger than the predetermined temperature may be output to the second valve.

According to a parts cooling method for a gas turbine as a nineteenth aspect according to the invention for the purpose of accomplishing the above-described objective, in the parts cooling method for a gas turbine according to the eighteenth aspect, in the second control step, when the intake temperature has reached a temperature between a first temperature that is the predetermined temperature and a second temperature higher than the first temperature, a control signal according to a constant degree of valve opening may be output to the second valve regardless of a change in the intake temperature, and when the intake temperature has become equal to or higher than the second temperature, a control signal according to a degree of valve opening which is equal to or less than the degree of valve opening of the second valve at a value of the intake temperature smaller than the second temperature may be output to the second valve.

According to a parts cooling method for a gas turbine as a twentieth aspect according to the invention for the purpose of accomplishing the above-described objective, in the parts cooling method for a gas turbine according to any one of the fifteenth to nineteenth aspects, the parameter value may include the output correlation value, and in the second control step, when the output correlation value has become equal to or less than a predetermined correlation value, a control signal according to a degree of valve opening which is equal to or greater than the degree of valve opening of the second valve at a value of the output correlation value larger than the predetermined correlation value may be output to the second valve.

Advantageous Effects of Invention

According to an aspect of the present invention, cooling air can be appropriately supplied to a hot part.

BRIEF DESCRIPTION OF DRAWINGS

FIG. 5 (A) is a graph showing a relationship between the gas turbine output and the degree of valve opening of the first valve. FIG. 5 (B) is a graph showing a relationship between the gas turbine output and the degree of opening of the IGV. FIG. 5 (C) is a graph showing a relationship between the intake temperature and the degree of valve opening of the first valve when the gas turbine output is high.

FIG. 6 (A) is a graph showing a relationship between the gas turbine output and the degree of valve opening of the second valve. FIG. 6 (B) is a graph showing a relationship between the gas turbine output and the degree of opening of the IGV. FIG. 6 (C) is a graph showing a relationship between the intake temperature and the degree of valve opening of the second valve when the gas turbine output is high. FIG. 6 (D) is a graph showing a relationship between the intake temperature and the degree of valve opening of the second valve when the gas turbine output is low.

FIG. 11 (A) is a graph showing a relationship between the gas turbine output and the degree of valve opening of the first valve. FIG. 11 (B) is a graph showing a relationship between the gas turbine output and the degree of opening of the IGV. FIG. 11 (C) is a graph showing a relationship between the intake temperature and the degree of valve opening of the first valve when the gas turbine output is high.

FIG. 12 (A) is a graph showing a relationship between the gas turbine output and the degree of valve opening of the second valve. FIG. 12 (B) is a graph showing a relationship between the gas turbine output and the degree of opening of the IGV. FIG. 12 (C) is a graph showing a relationship between the intake temperature and the degree of valve opening of the second valve when the gas turbine output is high. FIG. 12 (D) is a graph showing a relationship between the intake temperature and the degree of valve opening of the second valve when the gas turbine output is low.

DESCRIPTION OF EMBODIMENTS

Hereinafter, various embodiments and various modified examples thereof according to the present invention will be described in detail with reference to the drawings.

First Embodiment

A first embodiment of gas turbine equipment according to the present invention will be described with reference to FIGS. 1 to 9.

Figure 1:
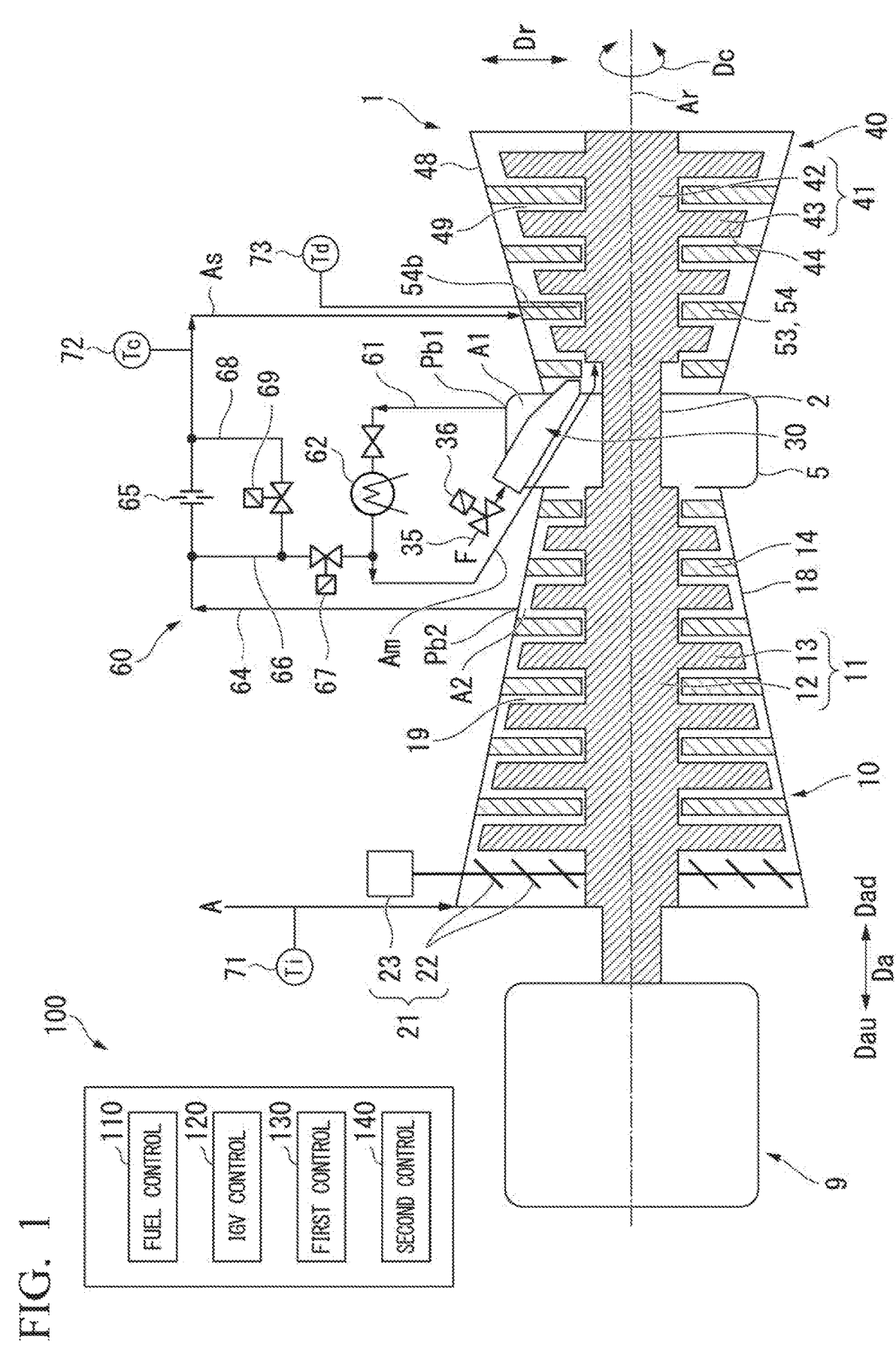
FIG. 1 is a schematic diagram showing an overall constitution of gas turbine equipment in a first embodiment according to the present invention.

As shown in FIG. 1, the gas turbine equipment in this embodiment includes a gas turbine 1, a cooling system 60 configured to cool parts constituting the gas turbine 1, and a control device 100. The gas turbine 1 includes a compressor 10 configured to compress air, a combustor 30 configured to burn a fuel F in the air compressed by the compressor 10 to generate a combustion gas, and a turbine 40 driven using the combustion gas.

Figure 2:
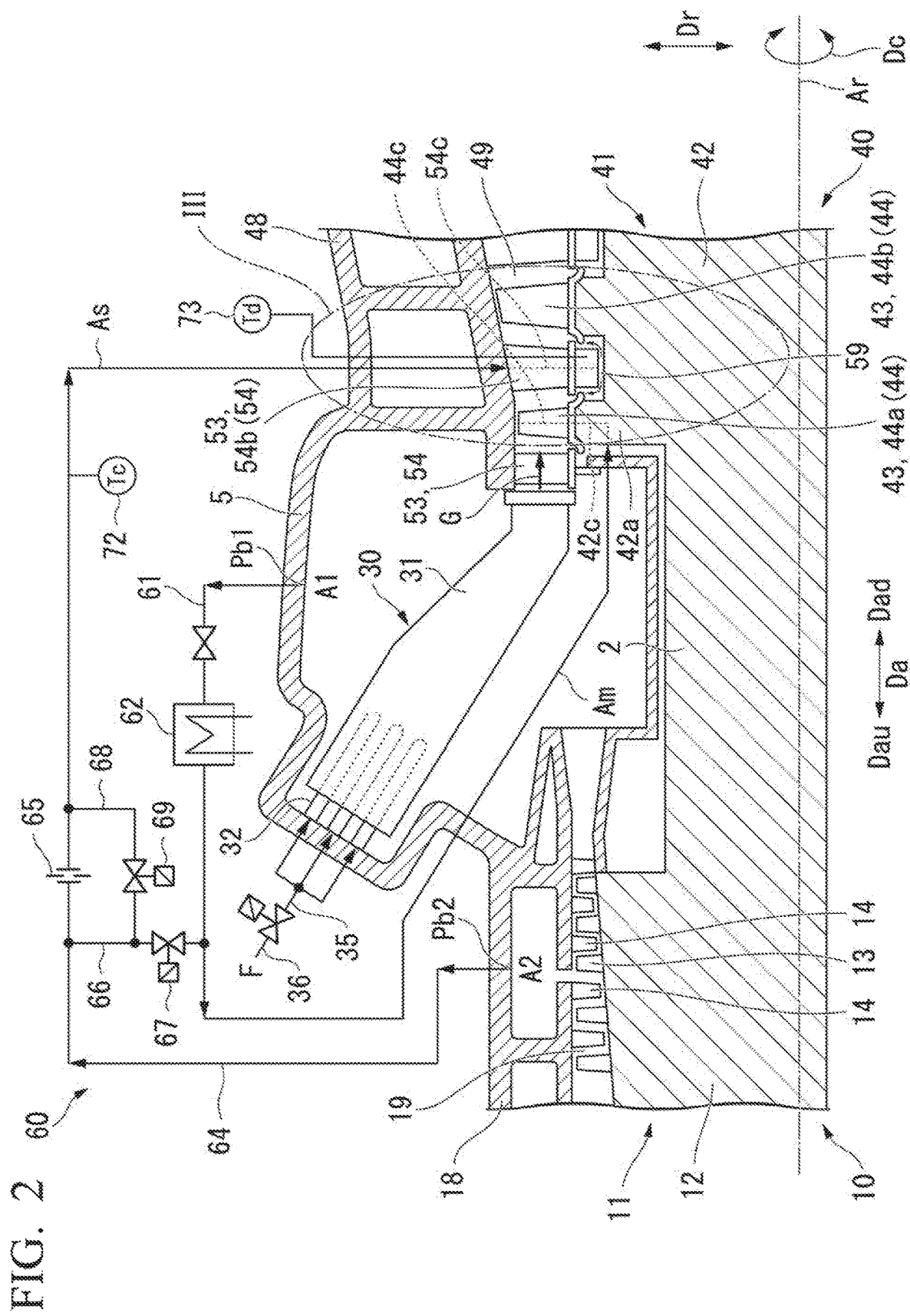
FIG. 2 is a cross-sectional diagram showing a main portion of a gas turbine in the first embodiment according to the present invention.

As shown in FIGS. 1 and 2, the compressor 10 includes a compressor rotor 11 rotating about an axis Ar, a compressor casing 18 configured to cover the compressor rotor 11, a plurality of vane rows 14, and an inlet guide vane (IGV) 21 configured to adjust a flow rate of air flowing into the compressor casing 18. Note that, hereinafter, a direction, along which the axis Ar extends is set to be an axial direction Da, one side in the axial direction Da is set to be an upstream side Dau, and the other side therein is set to be a downstream side Dad. The upstream side Dau is the upstream side Dau of a flow of air inside the compressor 10 and the upstream side Dau of a flow of the combustion gas inside the turbine 40. The downstream side Dad is the downstream side Dad of the flow of air inside the compressor 10 and the downstream side Dad of the flow of the combustion gas inside the turbine 40. Furthermore, a circumferential direction about the axis Ar is simply set to be a circumferential direction Dc, and a direction perpendicular to the axis Ar is set to be a radial direction Dr. The compressor rotor 11 includes a rotor shaft 12 extending in the axial direction Da about the axis Ar and a plurality of blade rows 13 attached to the rotor shaft 12. The plurality of blade rows 13 are arranged in the axial direction Da. Each of the blade rows 13 is constituted of a plurality of blades arranged in the circumferential direction Dc. The vane rows 14 are respectively disposed at the downstream side Dad of the plurality of blade rows 13. The vane rows 14 are provided inside the compressor casing 18. Each of the vane rows 14 is constituted of a plurality of vanes arranged in the circumferential direction Dc. An air compression flow path 19 in which air flows and is compressed is formed in an annular space of a region which is between a radially outer circumferential side of the rotor shaft 12 and a radially inner circumferential side of the compressor casing 18, and in which the vane rows 14 and the blade rows 13 are disposed in the axial direction Da. In other words, the compressor 10 is an axial multi-stage compressor. The combustor 30 is accommodated and fixed at a position inside the compressor casing 18 closer to the downstream side Dad than a position at which the air compression flow path 19 is formed.

The IGV 21 includes a plurality of movable vanes 22 and a drive unit 23 configured to change angles of the plurality of movable vanes 22. The plurality of movable vanes 22 are disposed closer to the upstream side Dau than a blade row located farthest at the upstream side Dau among the plurality of blade rows 13.

The turbine 40 includes a turbine rotor 41 rotating about the axis Ar, a turbine casing 48 configured to cover the turbine rotor 41, and a plurality of vane rows 53. The turbine rotor 41 includes a rotor shall 42 extending in the axial direction Da about the axis Ar and a plurality of blade rows 43 attached to the rotor shaft 42. The plurality of blade rows 43 are arranged in the axial direction Da. Each of the blade rows 43 is constituted of a plurality of blades 44 arranged in the circumferential direction Dc. The vane rows 53 are respectively disposed at the upstream side Dau of the plurality of blade rows 43. The vine rows 53 are provided inside the turbine casing 48. Each of the vane rows 53 is constituted of a plurality of vanes 54 arranged in the circumferential direction Dc. An annular space in a region which is between an outer circumferential side of the rotor shall 42 and an inner circumferential side of the turbine casing 48, and in which the vane rows 53 and the blade rows 43 are disposed in the axial direction Da forms a combustion gas flow path 49 through which a combustion gas from the combustor 30 flows.

Figure 3:
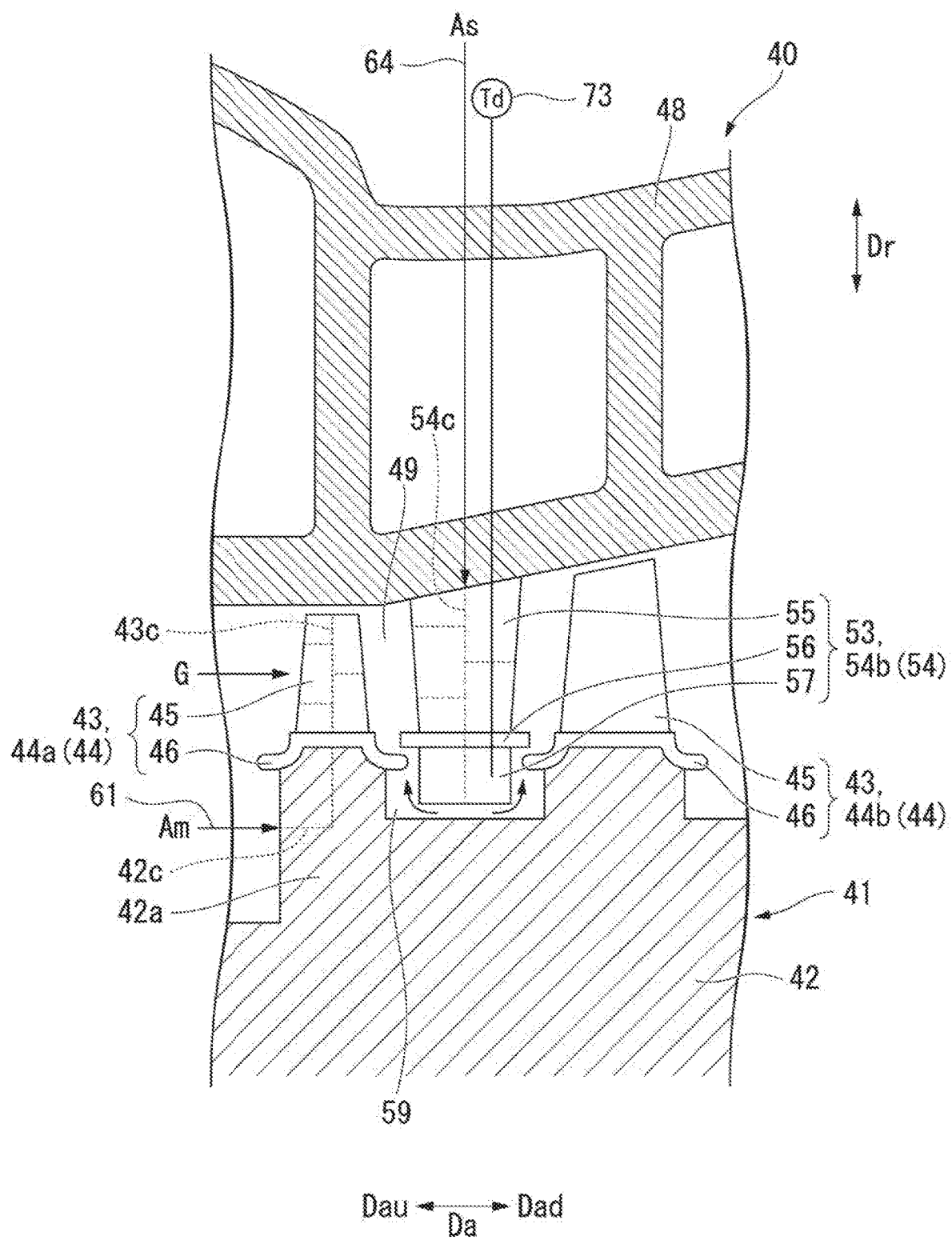
FIG. 3 is a detailed diagram of portion III in FIG. 2.

As shown in FIG. 3, the vane 54 includes a blade body 55 extending in the radial direction Dr, an inner shroud 56 provided inside the blade body 55 in the radial direction Dr, and a sealing member 57 provided inside the inner shroud 56 in the radial direction Dr. An outer part of the blade body 55 in the radial direction Dr is attached to the turbine casing 48. The inner shroud 56 is a member configured to define a part of an inner side of the annular combustion gas flow path 49 in the radial direction Dr. The sealing member 57 faces the rotor shaft 42 of the rotating turbine rotor 41 with a space therebetween. A space which is closer to an inner side in the radial direction Dr than the inner shroud 56 and between the sealing member 57 and the rotor shaft 42 of the turbine rotor 41 forms a disc cavity 59 that is a space.

The blade 44 includes a blade body 45 extending in the radial direction Dr and a platform 46 provided inside the blade body 45 in the radial direction Dr. The platform 46 is a member configured to define a part of an inner side of the annular combustion gas flow path 49 in the radial direction Dr.

As shown in FIG. 1, the number of stages of the turbine 40 in this embodiment is four. For this reason, in the turbine 40 in this embodiment, a first vane row, a second vane row, a third vane row, and a fourth vane row constitute the vane rows 53. Furthermore, in the turbine 40 in this embodiment a first blade row, a second blade row, a third blade row, and a fourth blade row constitute the blade rows 43.

As shown in FIG. 2, the combustor 30 includes a combustion liner (or a transition piece) 31 configured to send a high temperature and high pressure combustion gas G to an inside of the combustion gas flow path 49 of the turbine 40, and a fuel injector 32 configured to inject the air compressed in the compressor 10 and the fuel F to an inside of the combustion liner 31. A fuel line 35 through which the fuel F flows is connected to the fuel injector 32. A fuel control valve 36 is provided in the fuel line 35.

As shown in FIG. 1, the compressor rotor 11 and the turbine rotor 41 are located on the same axis Ar, are connected to each other, and form a gas turbine rotor 2. For example, a rotor of an electric power generator 9 (refer to FIG. 1) is connected to the gas turbine rotor 2. Furthermore, the compressor casing 18 and the turbine casing 48 are connected to each other to form a gas turbine casing 5. Note that a portion in the gas turbine casing 5 at which the combustor 30 is provided may be referred to as a combustor casing, and a casing closer to the upstream side Dau than the combustor casing may be referred to as a compressor casing in some cases. However, a casing including the combustor casing is set to be the compressor casing 18 in this specification.

As shown in FIGS. 1 and 2, the cooling system 60 includes a high pressure bleed line 61, a cooler 62, a low pressure bleed line 64, an orifice 65, a connecting line 66, a first valve 67, a bypass line 68, and a second valve 69. The high pressure bleed line 61 bleeds air from a first bleed position Pb1 of the compressor 10 and sends the air to the turbine rotor 41. The cooler 62 cools air passing through the high pressure bleed line 61. The low pressure bleed line 64 bleeds air from a second bleed position Pb2 of the compressor 10 and sends the air to the vanes 54 of the turbine 40. The orifice 65 limits a flow rate of air flowing through the low pressure bleed line 64. The connecting line 66 connects the high pressure bleed line 61 and the low pressure bleed line 64. The first valve 67 is provided in the connecting line 66. The bypass line 68 connects the connecting line 66 and the low pressure bleed line 64. The second valve 69 is provided in the bypass line 68.

A first end of the high pressure bleed line 61 is connected to a position of a portion in the compressor casing 18 at which the combustor 30 is accommodated. In other words, the first bleed position Pb1 of the compressor 10 corresponds to the position of the portion in the compressor casing 18 at which the combustor 30 is accommodated. The highest pressure air in the compressor casing 18 of air flowing out of the air compression flow path 19 of the compressor 10 is present at the portion in the compressor casing 18 at which the combustor 30 is accommodated. A second end of the high pressure bleed line 61 is connected to a first-stage shall 42a of the rotor shaft 42 in the turbine rotor 41 to which the first blade row is fixed. A cooling passage 42c communicating with the high pressure bleed line 61 is formed in the first-stage shaft 42a. Furthermore, cooling passages 44c communicating with the cooling passage 42c of the first-stage shaft 42a are formed in a plurality of first-row blades 44a constituting the first blade row. The cooling passages 44c in the first-row blades 44a are open at portions in surfaces of the first-row blades 44a coming into contact with the combustion gas G. For this reason, high pressure compressed air A1 bled from the first bleed position Pb1 of the compressor 10 is released into the combustion gas flow path 49 via the high pressure bleed line 61, the cooling passage 42c formed in the first-stage shaft 42a, and the cooling passages 44c formed in the first-row blades 44a as blade cooling air Am.

A first end of the low pressure bleed line 64 is connected to a position of an intermediate stage in the compressor casing 18. In other words, the second bleed position Pb2 of the compressor 10 corresponds to the position of the intermediate stage inside the compressor casing 18. A pressure of air at the position of the intermediate stage inside the compressor casing 18 is lower than the pressure of the air at the portion in the compressor casing 18 in which the combustor 30 is accommodated. A second end of the low pressure bleed line 64 is connected to a plurality of second-row vanes 54b constituting the second vane row via the turbine casing 48. Cooling passages 54c communicating with the low pressure bleed line 64 are formed in the second-row vanes 54b. Some of the cooling passages 54c extend to the sealing member 57. Some of the cooling passages 54c of the second-row vanes 54b are open at portions in surfaces of the second-row vanes 54b coming into contact with the combustion gas G. The cooling passages 54c extending to the sealing member 57 communicate with the disc cavity 59. For this reason, a portion of low pressure compressed air A2 bled from the second bleed position Pb2 of the compressor 10 is released into the combustion gas flow path 49 via the low pressure bleed line 64 and the cooling passages 54c of the second-row vanes 54b as vane cooling air As. Furthermore, another portion of the low pressure compressed air A2 bled from the second bleed position Pb2 of the compressor 10 flows into the disc cavity 59 via the low pressure bleed line 64 and the cooling passages 54c of the second-row vanes 54b.

The connecting line 66 connects a position in the high pressure bleed line 61 closer to the turbine rotor 41 side than the cooler 62 and a position in the low pressure bleed line 64 closer to the second bleed position Pb2 side than the orifice 65. The bypass line 68 connects a position in the connecting line 66 closer to the low pressure bleed line 64 side than the first valve 67 and a position in the low pressure bleed line 64 closer to the second-row vanes 54b side than the orifice 65.

The cooling system 60 further includes an intake thermometer 71 (refer to FIG. 1), a cooling air thermometer 72, a disc cavity thermometer 73, a first control unit 130, and a second control unit 140. The intake thermometer 71 detects an intake temperature Ti that is a temperature of air suctioned by the compressor 10. The cooling air thermometer 72 detects a temperature of air at a position in the low pressure bleed line 64 closer to the second-row vanes 54b side than a position of connection with the bypass line 68, that is, a temperature of the vane cooling air As. The disc cavity thermometer 73 detects a temperature of air inside the disc cavity 59 (hereinafter referred to as a "disc cavity temperature Td"). The first control unit 130 controls the degree of valve opening of the first valve 67. The second control unit 140 controls the degree of valve opening of the second valve 69.

As described above with reference to FIG. 3, the vane cooling air As passing and coming through the cooling passages 54c of the second-row vanes 54b flows into the disc cavity 59. Furthermore the combustion gas G flowing through the combustion gas flow path 49 may also flow into the disc cavity 59. For this reason, the disc cavity temperature Td is determined by temperatures and flow rates of the vane cooling air As and the combustion gas G flowing into the disc cavity 59. The disc cavity temperature Td generally increases when the gas turbine output increases.

The first control unit 130 and the second control unit 140 of the cooling system 60 serve as a part of a functional constitution of the control device 100. The control device 100 includes a fuel control unit 110 configured to control a degree of valve opening of the fuel control valve 36 and an IGV control unit 120 configured to control a degree of opening IGVp of the IGV in addition to the first control unit 130 and the second control unit 140.

The fuel control unit 110 acquires a flow rate of a fuel supplied to the combustor 30 in accordance with a command value associated with an electric power generator output, an electric power generator output value detected by an output meter, the intake temperature Ti of air suctioned by the gas turbine 1, the exhaust temperature of an exhaust gas discharged by the gas turbine 1, and the like. The fuel control unit 110 creates a control signal according to the fuel flow rate and outputs the control signal to the fuel control valve 36.

The IGV control unit 120 acquires the degree of opening IGVp of the IGV in accordance with a command value associated with an electric power generator output, an electric power generator output value detected by the output meter, the intake temperature Ti of the air suctioned by the gas turbine 1 and the like. The IGV control unit 120 creates a control signal according to the degree of opening IGVp of the IGV and outputs the control signal to the IGV 21. Furthermore, the IGV control unit 120 also outputs the acquired degree of opening IGVp of the IGV to the first control unit 130 and the second control unit 140.

Figure 4:
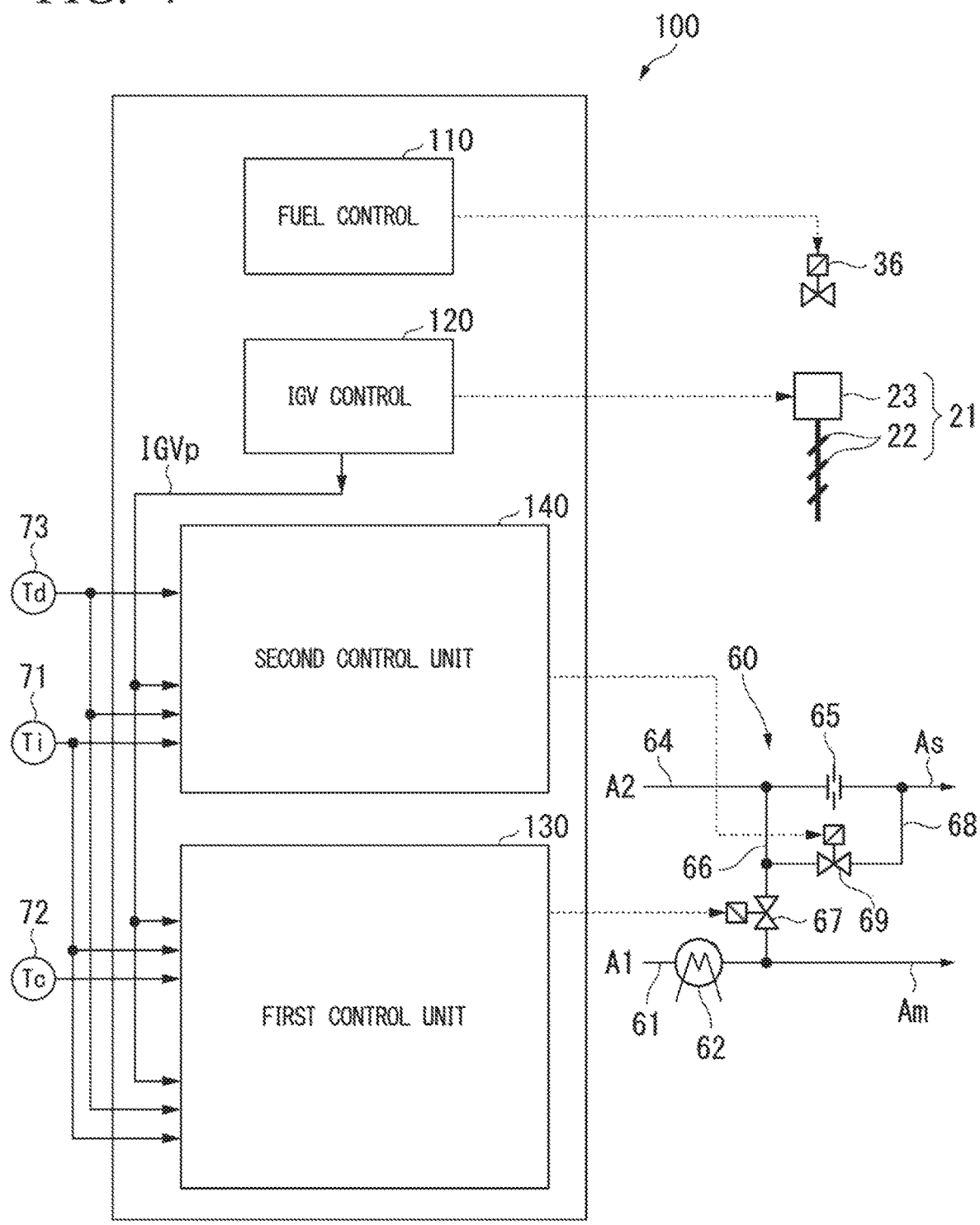
FIG. 4 is a functional, block diagram of a control device in the first embodiment according to the present invention.

As shown in FIG. 4, the first control unit 130 determines a degree of valve opening V1p of the first valve 67 in accordance with the degree of opening IGVp of the IGV acquired by the IGV control unit 120, the intake temperature Ti detected by the intake thermometer 71, the disc cavity temperature Td detected by the disc cavity thermometer 73, and a temperature Tc of the vane cooling air As detected by the cooling air thermometer 72, and outputs a control signal according to the degree of valve opening V1p to the first valve 67.

The second control unit 140 determines a degree of valve opening V2p of the second valve 69 in accordance with the degree of opening IGVp of the IGV acquired by the IGV control unit 120, the intake temperature Ti detected by the intake thermometer 71, and the disc cavity temperature Td detected by the disc cavity thermometer 73, and outputs a control signal according to the degree of valve opening V2p to the second valve 69.

Next, an operation of the above-described gas turbine equipment will be described.

The compressor 10 suctions and compresses outside air and generates compressed air. Some of the compressed air generated by the compressor 10 is jetted into the combustion liner 31 via the fuel injector 32 of the combustor 30. Furthermore, the fuel F from the fuel injector 32 is injected into the combustion liner 31. The fuel F burns in the compressed air inside the combustion liner 31. As a result of the burning, the combustion gas G is generated and the combustion gas G flows from the combustion liner 31 into the combustion gas flow path 49 of the turbine 40. The turbine rotor 41 rotates when the combustion gas G passes through the combustion gas flow path 49.

The blades 44 and the vanes 54 of the turbine 40 which are disposed inside the combustion gas flow path 49 are exposed to the high temperature combustion gas G. For this reason, in this embodiment, the blades 44 and the vanes 54 of the turbine 40 are cooled by supplying air bled from the compressor 10 to the blades 44 and the vanes 54 as cooling air.

Figure 9:
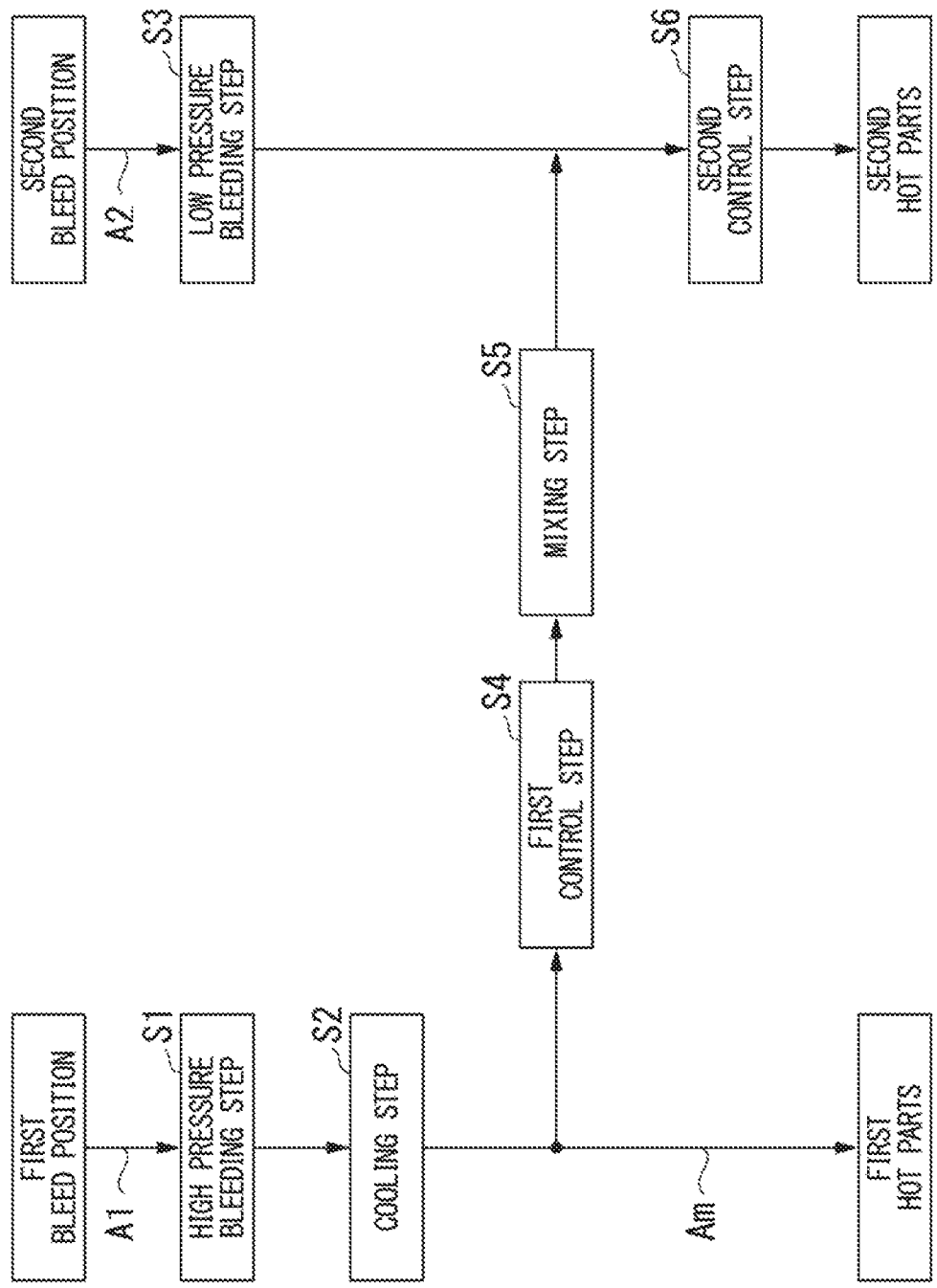
FIG. 9 is a flowchart for describing procedures of a parts cooling method in the first embodiment according to the present invention.

Hereinafter, an operation of the cooling system 60 will be described with reference to a flowchart shown in FIG. 9.

As shown in FIG. 2, the high pressure compressed air A1 bled from the first bleed position Pb1 of the compressor 10, that is, the position of the portion in the compressor casing 18 at which the combustor 30 is accommodated, is supplied to the first-row blades 44a via the high pressure bleed line 61 and the cooler 62 and cools the first-row blades 44a (S1: a high pressure bleeding step). The high pressure compressed air A1 is cooled in a process in which it flows through the cooler 62 (S2: a cooling step) and is supplied to the first-row blades 44a (first hot parts) as the blade cooling air Am. The blade cooling air Am is heated through a heat exchange with the first-row blades 44a in a process in which it passes through the cooling passages 44c in the first-row blades 44a and is then released from the first-row blades 44a into the combustion gas flow path 49.

The low pressure compressed air A2 bled from the second bleed position Pb2 of the compressor 10, that is, the intermediate stage in the compressor casing 18, is supplied as the vane cooling air As to the second-row vanes 54b via the low pressure bleed line 64 (S3: a low pressure bleeding step). Furthermore, the high pressure compressed air A1 which is bled from the first bleed position Pb1 of the compressor 10 and cooled by the cooler 62 is mixed into the low pressure compressed air A2 via the connecting line 66 (S5: a mixing step), and this mixture is supplied as the vane cooling air As (parts inflow air) to the second-row vanes 54b (second hot parts) in some cases. The flow rate of the high pressure compressed air A1 mixed into the low pressure compressed air A2 is controlled by the first valve 67 (S4: a first control step). The flow rate of the vane cooling air As (the parts inflow air) supplied to the second-row vanes 54b (the second hot parts) is controlled by the second valve 69 (S6: a second control step). The vane cooling air As supplied to the second-row vanes 54b is heated through a heat exchange with the second-row vanes 54b in a process in which it passes through the cooling passages 54c in the second-row vanes 54b, and a portion thereof is released from the second-row vanes 54b into the combustion gas flow path 49. A portion of the remaining vane cooling air As flows from the cooling passages in the second-row vanes 54b into the disc cavity 59.

As shown in FIG. 3, a portion of the air flowing into the disc cavity 59 flows into the combustion gas flow path 49 via a space between the inner shroud 56 of the second-row vanes 54b and the platform 46 of the first-row blades 44a. Another portion of the air flowing into the disc cavity 59 flows into the combustion gas flow path 49 via the space between the inner shroud 56 of the second-row vanes 54b and the platform 46 of the second-row blades 44b. In this way, the air flowing from the second-row vanes 54b into the disc cavity 59 flows into the combustion gas flow path 49 and serves as sealing air used to prevent the high temperature combustion gas G flowing through the combustion gas flow path 49 from flowing into the disc cavity 59.

Figure 5:
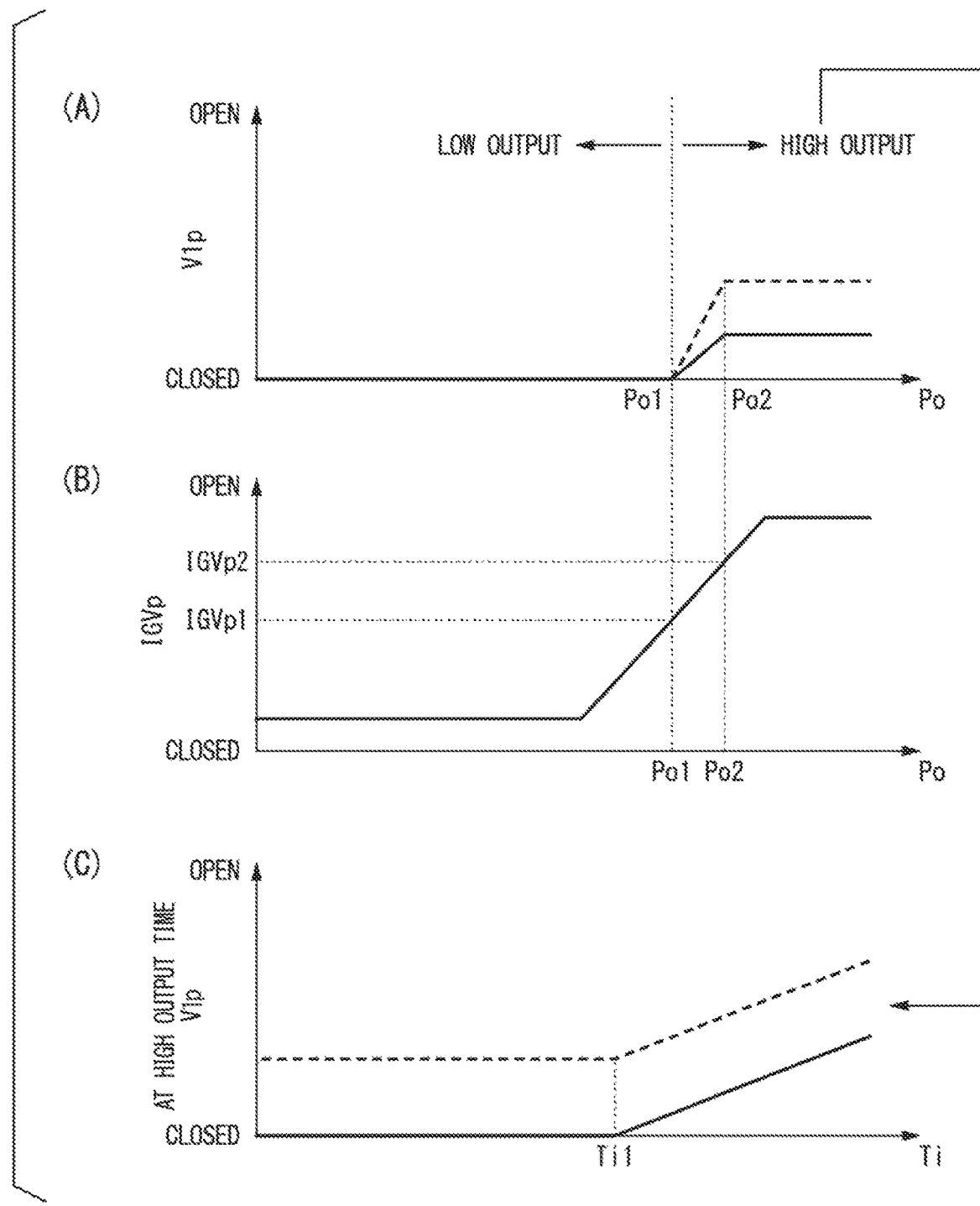
FIG. 5 shows relationships among a degree of valve opening of a first valve, a degree of opening of an inlet guide vane (IGV), a gas turbine output, and an intake temperature in the first embodiment according to the present invention.
Figure 6:
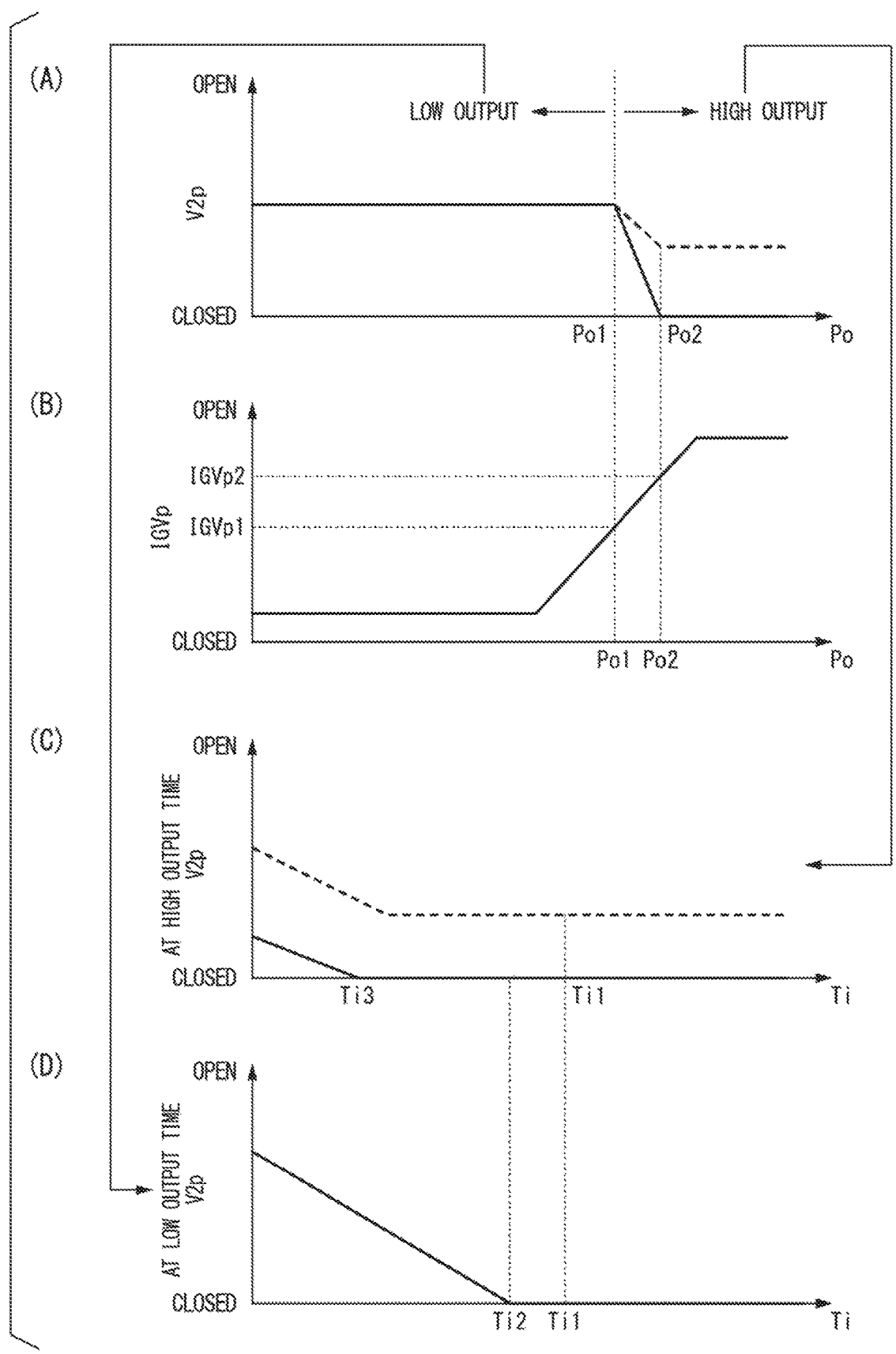
FIG. 6 shows relationships among a degree of valve opening of a second valve, the degree of opening of the IGV, the gas turbine output, and the intake temperature in the first embodiment according to the present invention.

As shown in FIG. 5 (B) and FIG. 6 (B), the degree of opening IGVp of the IGV gradually increases as a gas turbine output (≈an electric power generator output) Po increases. In other words, the degree of opening IGVp of the IGV has a positive correlation with the gas turbine output Po. Thus, in this embodiment, the degree of opening IGVp of the IGV is dealt with as a correlation value of the gas turbine output Po.

When the gas turbine output Po is high, that is, when the degree of opening IGVp of the IGV is large, a temperature of the combustion gas G increases. Furthermore, also when the intake temperature Ti is high, the temperature of the combustion gas G increases. For this reason, when the gas turbine output Po is high, that is, when the degree of opening IGVp of the IGV is large and when the intake temperature Ti is high, the temperature of cooling air is preferably reduced.

In the first control step (S1), when the first valve 67 in the cooling system 60 is opened, the high pressure compressed air A1 which is bled from the first bleed position Pb1 of the compressor 10 and cooled by the cooler 62 flows into the low pressure bleed line 64 via the connecting line 66 and is mixed with the low pressure compressed air A2 in the low pressure bleed line 64. The temperature of the high pressure compressed air A1 which is cooled by the cooler 62 is lower than the temperature of the low pressure compressed air A2 which is bled from the second bleed position Pb2. For this reason, in this embodiment, when the temperature of the vane cooling air As supplied to the second-row vanes 54b is to be decreased, the first valve 67 is opened.

Thus, in the first control step (S1), as shown in FIG. 5 (A) and FIG. 5 (B), the first control unit 130 determines a completely closed state as the degree of valve opening V1p of the first valve 67 regardless of the intake temperature Ti, at a low output time when the degree of opening IGVp of the IGV that is a correlation value of the gas turbine output Po is equal to or less than a first degree of opening IGVp1 of the IGV (a gas turbine output Po1). Furthermore, the first control unit 130 determines a degree of valve opening which is open as the degree of valve opening V1p of the first valve 67, at a high output time when the degree of opening IGVp of the IGV is larger than the first degree of opening IGVp1 of the IGV (the gas turbine output Po1). The first control unit 130 determines, as the degree of valve opening V1p of the first valve 67, a degree of valve opening gradually increasing as the degree of opening IGVp of the IGV increases, when the degree of opening IGVp of the IGV is within a range from the first degree of opening IGVp1 of the IGV (the gas turbine output Po1) to a second degree of opening IGVp1 of the IGV (a gas turbine output Po2) or less which is larger than the first degree of opening IGVp1 of the IGV. Furthermore, the first control unit 130 determines a constant degree of valve opening as the degree of valve opening V1p of the first valve 67, when the degree of opening IGVp of the IGV has become larger than the second degree of opening IGVp2 of the IGV.

Here, the first control unit 130 corrects the degree of valve opening V1p of the first valve 67 determined as described above in accordance with the intake temperature Ti at the high output time. To be specific, when the intake temperature Ti has become equal to or higher than a predetermined first intake temperature Ti1 at the high output time as indicated by a solid line in FIG. 5 (C), the first control unit 130 acquires such a correction factor that the degree of valve opening V1p of the first valve 67 increases along with an increase of the intake temperature Ti. Moreover, the first control unit 130 multiplies the degree of valve opening V1p of the first valve 67 determined as described above by the correction factor and corrects the degree of valve opening V1p.

In other words, when the intake temperature Ti increases, the first control unit 130 corrects the degree of valve opening V1p of the first valve 67 so that the degree of valve opening V1p determined as described above increases.

When the disc cavity temperature Td has become equal to or higher than a first limit temperature Td1 at the high output time, as indicated by a broken line in FIG. 5 (A), when the degree of opening IGVp of the IGV is within the range from the first degree of opening IGVp1 of the IGV to the second degree of opening IGVp2 of the IGV or less, the first control unit 130 determines, as the degree of valve opening V1p of the first valve 67, a degree of valve opening which gradually increases as the degree of opening IGVp of the IGV increases and is larger than a degree of valve opening within the same range at the disc cavity temperature Td less than the first limit temperature Td1. Furthermore, when the disc cavity temperature Td has become equal to or higher than the first limit temperature Td1 at the high output time and the degree of opening IGVp of the IGV has become larger than the second degree of opening IGVp2 of the IGV, the first control unit 130 determines, as the degree of valve opening V1p of the first valve 67, a degree of valve opening which is a constant degree of valve opening and is larger than the degree of valve opening within the same range at the disc cavity temperature Td less than the first limit temperature Td1.

Here, also when the disc cavity temperature Td has become equal to or higher than the first limit temperature Td1 at the high output time, the first control unit 130 corrects the degree of valve opening V1p of the first valve 67 determined as described above in accordance with the intake temperature Ti. To be specific, the first control unit 130 acquires a constant correction factor with respect to the intake temperature Ti as indicated by a broken line in FIG. 5 (C), when the disc cavity temperature Td is equal to or higher than the first limit temperature Td1 and the intake temperature Ti is less than the predetermined first intake temperature Ti1 at the high output time. Moreover, the first control unit 130 multiplies the degree of valve opening V1p of the first valve 67 determined as described above by the correction factor and corrects the degree of value opening V1p. In addition, when the intake temperature Ti is equal to or higher than the predetermined first intake temperature Ti1, the first control unit 130 acquires such a correction factor that the degree of valve opening V1p of the first valve 67 increases along with the increase of the intake temperature Ti from the above-described constant degree of valve opening V1p. The first control unit 130 multiplies the degree of valve opening V1p of the first valve 67 determined as described above by the correction factor and corrects the degree of valve opening V1p.

The first control unit 130 acquires an amount of change in the degree of valve opening of the first valve 67 so that a temperature of the vane cooling air As in the low pressure bleed line 64 detected by the cooling air thermometer 72 becomes equal to a target temperature. The target temperature of the vane cooling air As changes in accordance with the intake temperature Ti, the degree of opening IGVp of the IGV, or the like. For this reason, the first control unit 130 acquires the target temperature according to the intake temperature Ti or the degree of opening IGVp of the IGV. The first control unit 130 acquires a deviation between the temperature Tc of the vane cooling air As detected by the cooling air thermometer 72 and the target temperature of the vane cooling air As. The first control unit 130 acquires an amount of proportional integral (PI) control that is an amount of change in the degree of opening of the first valve 67 according to the deviation.

The first control unit 130 adds the amount of change in the degree of opening of the first valve 67 according to the deviation between the temperature Tc of the vane cooling air As detected by the cooling air thermometer 72 and the target temperature of the vane cooling air As, to the degree of valve opening V1p of the first valve 67 determined as described above, and sets the result as the target degree of valve opening V1p of the first valve 67. The first control unit 130 creates a control signal according to the target degree of valve opening V1p and outputs the control signal to the first valve 67.

In this way, the vane cooling air As at a temperature appropriate for cooling the second-row vanes 54b can be basically sent to the second-row vanes 54b through control of the degree of valve opening V1p of the first valve 67 using the first control unit 130.

As described above, the vane cooling air As is sent to the second-row vanes 54b, and then a portion thereof flows into the combustion gas flow path 49 via the disc cavity 59, so that the vane cooling air As serves as sealing air used to prevent the high temperature combustion gas G flowing through the combustion gas flow path 49 from flowing into the disc cavity 59. For this reason, in the case of the vane cooling air As, a flow rate necessary for the vane cooling air As to serve as the sealing air is preferably secured.

As described, above, even when the vane cooling air As at a temperature appropriate for cooling the second-row vanes 54b can be sent to the second-row vanes 54b through control of the degree of valve opening V1p of the first valve 67, the flow rate necessary for the vane cooling air As to serve as the sealing air is not secured in some cases.

A flow rate at which the low pressure compressed air A2 bled from the second bleed position Pb2 of the compressor 10 is supplied as the vane cooling air As to the second-row vanes 54b via the low pressure bleed line 64 basically depends on a pressure difference between a pressure at the second bleed position Pb2 of the compressor 10 and a pressure around the second-row vanes 54b.

Figure 7:
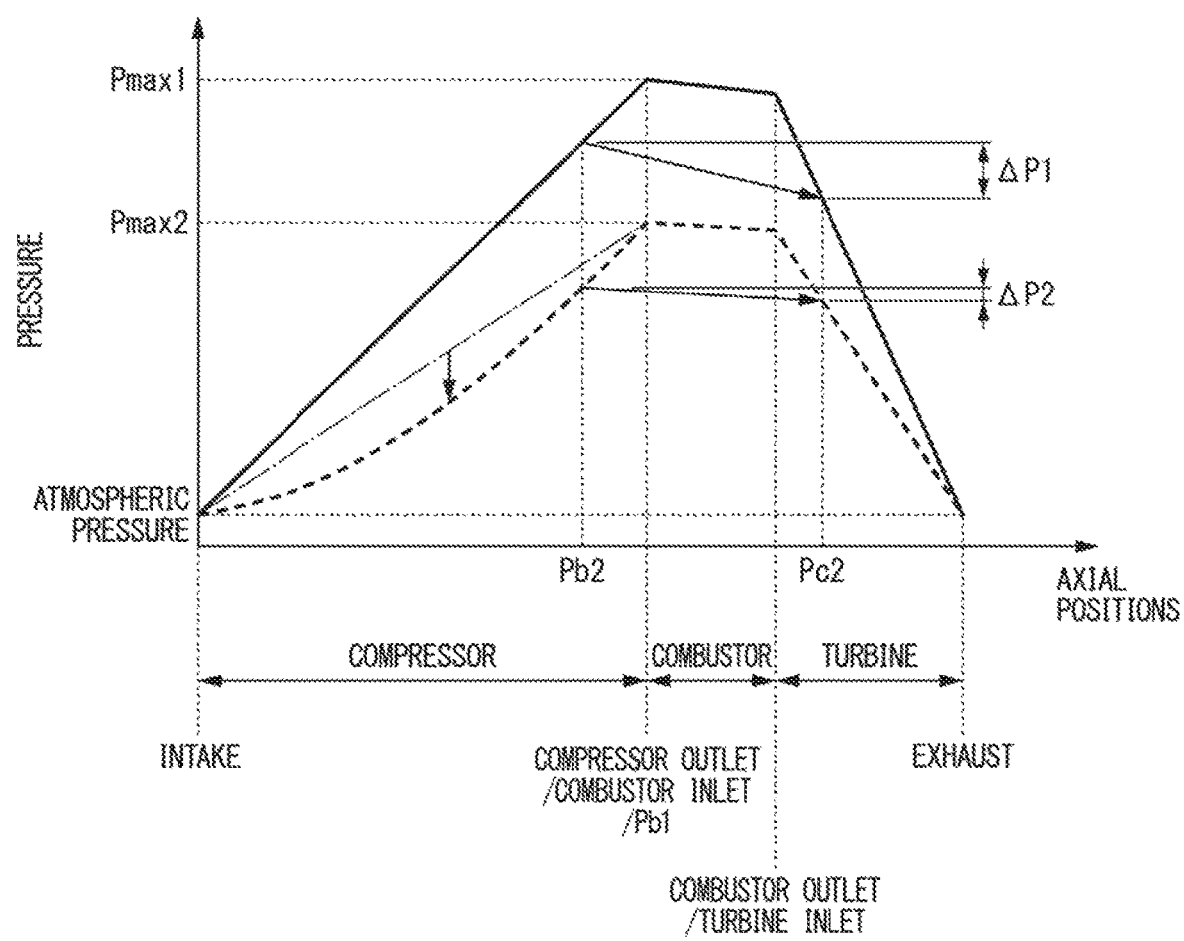
FIG. 7 is a graph showing pressures at axial positions in a gas turbine.

Thus, a change in the pressure difference between the pressure at the second bleed position Pb2 of the compressor 10 and the pressure around the second-row vanes 54b according to a change in the gas turbine output, that is, the degree of opening IGVp of the IGV, will be described with reference to FIG. 7. Note that, in FIG. 7, the horizontal axis indicates positions in the gas turbine 1 in the axial direction Da and the vertical axis indicates pressures.

Pressures at an intake position of the compressor 10 and an exhaust position of the turbine 40 are basically atmospheric pressure regardless of the gas turbine output. Furthermore, a pressure in an outlet of the compressor 10 (≈an inlet of the combustor 30≈the first bleed position Pb1) is the highest pressure in: the gas turbine 1.

Here, for example, when the gas turbine output is high, it is assumed that a pressure linearly increases from the intake position of the compressor 10 to the compressor outlet (≈the combustor inlet≈the first bleed position Pb1). A pressure in the compressor outlet (≈the combustor inlet≈the first bleed position Pb1) is the highest pressure Pmax1 in the gas turbine. Furthermore, for example, it is assumed that a pressure linearly decreases from the compressor outlet (≈the combustor inlet) to the combustor outlet the turbine inlet). In addition, for example, it is assumed that the pressure linearly decreases from the combustor outlet (≈the turbine inlet) to the exhaust position of the turbine 40. It is assumed that a pressure at a position Pc2 of the second-row vanes 54b closer to the downstream side Dad than the combustor outlet (≈the turbine inlet) is lower than a pressure at the second bleed position Pb2 closer to the upstream side Dau than the compressor outlet (≈the combustor inlet≈the first bleed position Pb1) by $\Delta P1$.

In a case in which pressures at positions in the gas turbine 1 have the foregoing trend when the gas turbine output is high, pressures at the positions in the gas turbine 1 have the following trend when the gas turbine output is low.

When the gas turbine output decreases, that is, when the degree of opening IGVp of the IGV is small, the compressor outlet (≈the first bleed position Pb1) at the highest pressure in the gas turbine 1 has a pressure Pmax2 that is lower by a predetermined pressure than the pressure Pmax1 at the same position when the gas turbine output is high. Here, a pressure in the compressor outlet (≈the first bleed position Pb1) at the low output time with respect to a pressure therein at the high output time is set to be a pressure reduction rate (=Pmax2/Pmax1). In the case of pressures at positions closer to the downstream side Dad than the compressor outlet (≈the first bleed position Pb1), the pressures at the positions at the low output time basically decrease at the same rate as the pressure reduction rate (=Pmax2/Pmax1) relative to the pressures at the positions at a high output time. However, in the case of pressures at positions closer to the upstream side Dau than the compressor outlet (≈the first bleed position Pb1), the pressures at the positions at the low output time decrease at a higher rate than the pressure reduction rate relative to the pressures at the positions at the high pressure output time. To be more specific, at an intake side (the upstream side Dau) of the compressor 10, a tendency of increase in pressure is small, and at a compressor outlet side, a tendency of increase in pressure is large. Moreover, a pressure in the compressor outlet (≈the first bleed position Pb1) is the above-described pressure Pmax2.

For this reason, when the gas turbine output is low, the pressure at the position Pc2 of the second-row vanes 54b closer to the downstream side Dad than the combustor outlet (≈the turbine inlet) decreases by $\Delta P2$, which is smaller than the above-described $\Delta P1$, relative to the pressure at the second bleed position Pb2 closer to the upstream side Dau than the compressor outlet (≈the combustor inlet≈the first bleed position Pb1). In other words, the pressure difference $\Delta P2$ between the pressure at the second bleed position Pb2 and the pressure at the position Pc2 of the second-row vanes 54b when the gas turbine output, is low is smaller than the pressure difference $\Delta P1$ between the pressure at the second bleed position Pb2 and the pressure at the position Pc2 of the second-row vanes 54b when the gas turbine output is high.

In this way, a pressure difference $\Delta P$ between the pressure at the second bleed position Pb2 and the pressure at the position Pc2 of the second-row vanes 54b when the gas turbine output is low is smaller than the pressure difference $\Delta P$ when the gas turbine output is high. For this reason, the flow rate at which the low pressure compressed air A2 bled from the second bleed position Pb2 of the compressor 10 is supplied as the vane cooling air As to the second-row vanes 54b via the low pressure bleed line 64 when the gas turbine output is low is lower than the flow rate thereof when the gas turbine output is high.

Also when the intake temperature Ti is low, the pressure difference $\Delta P$ between the pressure at the second, bleed, position Pb2 and fee pressure at the position Pc2 of the second-row vanes 54b is smaller than the pressure difference $\Delta P$ when the intake temperature Ti is high in the same manner as described above. For this reason, also when the intake temperature Ti is low, the flow rate at which the low pressure compressed air A2 bled from the second bleed position Pb2 of the compressor 10 is supplied as the vane cooling air As to the second-row vanes 54b via the low pressure, bleed line 64 is lower than the flow rate thereof when the intake temperature Ti is high.

As described above, when the gas turbine output is low or the intake temperature Ti is low, the flow rate at which the low pressure compressed, air A2 bled from the second bleed position Pb2 of the compressor 10 is supplied as the vane cooling air As to the second-row vanes 54b via the low pressure bleed line 64 is low. Therefore, when the gas turbine output is low or when the intake temperature Ti is low, the flow rate necessary for the vane cooling air As to serve as the sealing air is not secured in some cases.

After the flow rate of the low pressure compressed air A2 bled from the second bleed position Pb2 of the compressor 10 is limited by the orifice 65 in the low pressure bleed line 64, the low pressure compressed air A2 is supplied as the vane cooling air As to the second-row vanes 54b. Furthermore, also when the second valve 69 in the cooling system 60 is opened, a portion of the low pressure compressed air A2 bled fern the second bleed position Pb2 of the compressor 10 is supplied to the second-row vanes 54b via the low pressure bleed line 64 closer to the second-row vanes 54b side than the orifice 65 via the orifice 65. In addition, when the second valve 69 in the cooling system 60 is opened, another portion of the low pressure compressed air A2 bled from the second bleed position Pb2 of the compressor 10 passes through the connecting line 66 and the bypass line 68 and is supplied to the second-row vanes 54b via the low pressure bleed line 64 closer to the second-row vanes 54b side than a position of connection with the bypass line 68. Thus, the second valve 69 is opened so that a flow rate of the vane cooling air As supplied to the second-row vanes 54b can be increased. For this reason, in this embodiment, when the flow rate of the vane cooling air As is to be increased, the second valve 69 is opened.

Thus, in the second control step (S6), as shown in FIG. 6 (A) and FIG. 6 (B), the second control unit 140 determines a degree of valve opening which is open as the degree of valve opening V2p of the second valve 69, at the low output time when the degree of opening IGVp of the IGV that is a correlation value of the gas turbine output Po is equal to or less than the first degree of opening IGVp1 of the IGV. Furthermore, the second control unit 140 determines, as the degree of valve opening V2p of the second valve 69, the degree of valve opening V2p which is smaller than that at the low output time, gradually decreases as the degree of opening IGVp of the IGV increases, and is "0" at the second degree of opening IGVp2 of the IGV, at the high output time when the degree of opening IGVp of the IGV is larger than the first degree of opening IGVp1 of the IGV and is equal to or less than the second degree of opening IGVp2 of the IGV. In addition, the second control unit 140 determines a completely closed state "0" as the degree of valve opening V2p of the second valve 69, at the high output time when the degree of opening IGVp of the IGV is larger than the second degree of opening IGVp2 of the IGV.

Here, the second control unit 140 corrects the degree of valve opening V2p of the second valve 69 determined as described above in accordance with the intake temperature Ti. To be specific, as shown in FIG. 6 (D), the second control unit 140 acquires a correction factor indicating the completely closed state when the intake temperature Ti is higher than a second intake temperature Ti2, which is lower than the first intake temperature Ti1. Moreover, the second control unit 140 multiplies the degree of valve opening V2p of the second valve 69 determined as described above by the correction factor and corrects the degree of valve opening V2p. Furthermore, the second control unit 140 acquires such a correction factor that the degree of valve opening V2p gradually increases along with a decrease of the intake temperature Ti, when the intake temperature Ti has become equal to or less than the second intake temperature Ti2 at the low output time. The second control unit 140 multiplies the degree of valve opening V2p of the second valve 69 determined as described above by the correction factor and corrects the degree of valve opening V2p.

The second control unit 140 acquires the correction factor indicating the completely closed state when the intake temperature Ti is higher than a third intake temperature Ti3, which is lower than the second intake temperature Ti1, at the high output time as indicated by a solid line in FIG. 6 (C). Moreover, the second control unit 140 multiplies the degree of valve opening V2p of the second valve 69 determined as described above by the correction factor and corrects the degree of valve opening V2p. The second control unit 140 acquires such a correction factor that the degree of valve opening V2p gradually increases along with the decrease of the intake temperature Ti, when the intake temperature Ti has become equal to or lower than the third intake temperature Ti3 at the high output time. Moreover, the second control unit 140 multiplies the degree of valve opening V2p of the second valve 69 determined as described above by the correction factor and corrects the degree of valve opening V2p.

In other words, the second control unit 140 corrects the degree of valve opening V2p of the second valve 69 determined as described above so that the degree of valve opening V2p increases when the intake temperature Ti decreases at both the high output time and the low output time.

When the disc cavity temperature Td has become equal to or higher than the first limit temperature Td1 at the high output time, as indicated by a broken line in FIG. 6 (A), when the degree of opening IGVp of the IGV is within the range from the first degree of opening IGVp1 of the IGV to the second degree of opening IGVp1 of the IGV or less, the second control unit 140 determines, as the degree of valve opening V2p of the second valve 69, the degree of valve opening V2p winch decreases as the degree of opening IGVp of the IGV increases and is larger than the degree of valve opening V2p within the same range at the disc cavity temperature Td less than the first limit temperature Td1. When the disc cavity temperature Td has become equal to or higher than the first limit temperature Td1 and the degree of opening IGVp of the IGV has become larger than the second degree of opening IGVp2 of the IGV at the high output time, the second control unit 140 determines, as the degree of valve opening V2p of the second valve 69, the degree of valve opening V2p which is a constant degree of valve opening and is larger than the degree of valve opening V2p within the same range at the disc cavity temperature Td less than the first limit temperature Td1.

Here, the second control unit 140 corrects the degree of valve opening V2p of the second valve 69 determined as described above in accordance with the intake temperature Ti also when the disc cavity temperature Td has become equal to or higher than the first limit temperature Td1 at the high output time. To be specific, the second control unit 140 acquires a constant correction factor with respect to the intake temperature Ti as indicated by a broken line in FIG. 6 (C), when the disc cavity temperature Td is equal to or higher than the first limit temperature Td1 and the intake temperature Ti is higher than the third intake temperature Ti3 at the high output time. Moreover, the second control unit 140 multiplies the degree of valve opening V2p of the second valve 69 determined as described above by the correction factor and corrects the degree of valve opening V2p. The second control unit 140 acquires such a correction factor that the degree of valve opening V2p of the second valve 69 increases along with the decrease of the intake temperature Ti from the above-described constant degree of valve opening V2p, when the disc cavity temperature Td is equal to or higher than the first limit temperature Td1 and the intake temperature Ti is equal to or lower than the third intake temperature Ti3 at the high output time. The second control unit 140 multiplies the degree of valve opening V2p of the second valve 69 determined as described above by the correction factor and corrects the degree of valve opening V2p.

The second control unit 140 creates a control signal according to the degree of valve opening V2p of the second valve 69 determined as described above as long as the disc cavity temperature Td does not become equal to or higher than a third limit temperature Td3 and outputs the control signal to the second valve 69.

As describe above, the vane cooling air As at a temperature appropriate for cooling the second-row vanes 54b can be basically sent to the second-row vanes 54b through control of the degree of valve opening V1p of the first valve 67 using the first control unit 130. However, the second-row vanes 54b cannot be sufficiently cooled only by controlling the degree of valve opening V1p of the first valve 67 in some cases. For this reason, the second control unit 140 determines, as the degree of valve opening V2p of the second valve 69, the degree of valve opening V2p which is a constant degree of valve opening and is larger than the degree of valve opening V2p within the same range at the disc cavity temperature Td less than the first limit temperature Td1, when the disc cavity temperature Td has become equal to or higher than the first limit temperature Td1. As a result, the degree of valve opening V2p of the second valve 69 is further increased, so that a flow rate of air flowing through the bypass line 68 increases. For this reason, a flow rate of the vane cooling air As supplied from the low pressure bleed line 64 to the second-row vanes 54b increases, and thus a temperature rise in the second-row vanes 54b can be minimized.

Also, (be second control unit 140 determines is "fully open state" as the degree of valve opening V2p of the second valve 69 when the disc cavity temperature Td has become equal to or higher than the third limit temperature Td3, which is higher than the first limit temperature Td1. The second control unit 140 creates a control signal indicating the fully open state and outputs the control signal to the second valve 69. As a result, the degree of valve opening V1p of the second valve 69 reaches the fully open state, and thus the flow rate of the air flowing through the bypass line 68 further increases. For this reason, the flow rate of the vane cooling air As supplied from the low pressure bleed line 64 to the second-row vanes 54b further increases and a temperature rise in the second-row vanes 54b can be further minimized.

Next, the degrees of valve opening V1p and V2p of the first valve 67 and the second valve 69 according to an operational situation of the gas turbine 1 will be collectively described with reference to FIG. 8.

A pressure of the low pressure compressed air A2 bled from the second bleed position Pb1 when the gas turbine output is low, that is, when the degree of opening IGVp of the IGV is equal to or less than the first degree of opening IGVp1 of the IGV, is lower than the pressure thereof when the gas turbine output is high. For this reason, a temperature of the low pressure compressed air A2 bled from the second bleed position Pb1 when lite gas turbine output is low is lower than the temperature thereof when the gas turbine output is high. Therefore, if the low pressure compressed air A2 from the second bleed position Pb1 is supplied as the vane cooling air As to the second-row vanes 54b, the second-row vanes 54b can be basically cooled to a target temperature or less, and thus the high pressure compressed air A1 cooled by the cooler 62 need not be sent to the low pressure bleed line 64. Thus, in this embodiment, when the gas turbine output is low, that is, when the degree of opening IGVp of the IGV is equal to or less than the first degree of opening IGVp1 of the IGV, the first valve 67 provided in the connecting line 66 is basically completely closed, as shown in sections in FIG. 8 representing the ease where the gas turbine output is low.

Also, when the intake temperature Ti which is a temperature of air suctioned by the compressor 10 is low, as described above, the pressure difference between the pressure at the second bleed position Pb2 of the compressor 10 and the pressure around the second-row vanes 54b is small. For this reason, a flow rate at which the low pressure compressed air A2 bled from the second bleed position Pb2 of the compressor 10 is supplied as the vane cooling air As to the second-row vanes 54b via only the low pressure bleed line 64 is low. Thus, in this embodiment when the intake temperature Ti is low, as shown in sections in FIG. 8 representing the case where the temperature is low, the second valve 69 provided in the bypass line 68 is opened. As a result, the low pressure compressed air A2 bled from the second bleed position Pb2 of the compressor 10 flows through the low pressure bleed line 64 in which the orifice 65 configured to limit the flow rate thereof is provided and also flows through the bypass line 68, and thus the flow rate of the vane cooling air As increases and a flow rate necessary for the vane cooling air As to serve as the sealing air can be secured.

Figure 8:
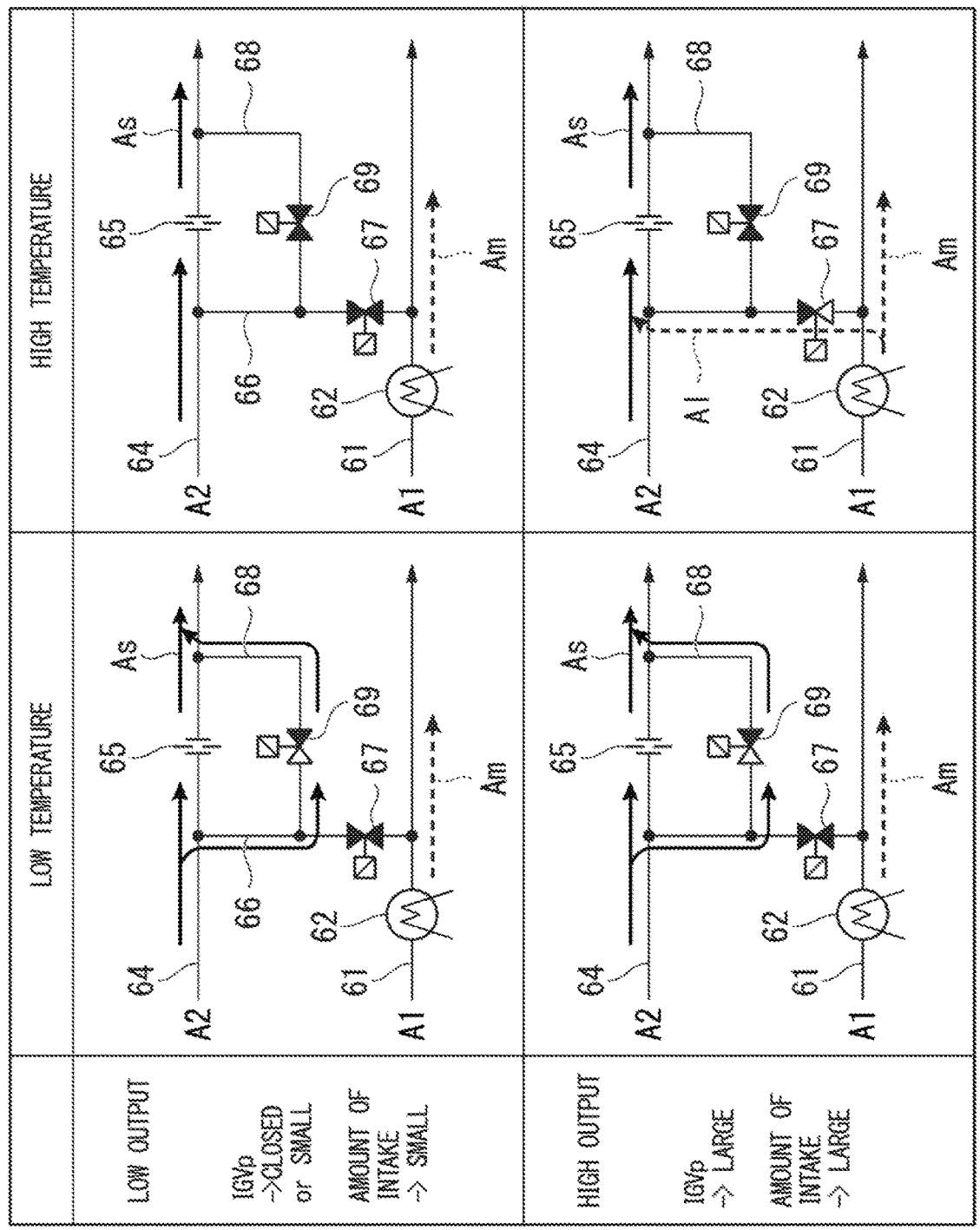
FIG. 8 is an explanatory diagram for describing states of the first valve and the second valve for each operation condition of the gas turbine in the first embodiment according to the present invention.

As described above, when the gas turbine output is low and the intake temperature Ti is low, in this embodiment, the first valve 67 is basically completely closed and the second valve 69 is opened as shown in the section in FIG. 8 representing the ease where the gas turbine output is low and the intake temperature Ti is low.

When the gas turbine output is high, that is, the degree of opening IGVp of the IGV is larger than the first degree of opening IGVp1 of the IGV, the temperature of the low pressure compressed air A2 bled from the second bleed position Pb2 is higher than the temperature thereof when the gas turbine output is low. However, when the intake temperature Ti is low, even when the gas turbine output is high, the temperature of the low pressure compressed air A2 bled from the second bleed position Pb2 is lower than the temperature thereof when the intake temperature Ti is high. Thus, if the low pressure compressed air A2 from the second bleed position Pb2 is supplied as the vane cooling air As to the second-row vanes 54b, the second-row vanes 54b can be basically cooled to a target temperature or less, and thus the high pressure compressed air A1 cooled by the cooler 62 need not be sent to the low pressure bleed line 64.

Also, when the gas turbine output is high, that is, the degree of opening IGVp of the IGV is larger than the first degree of opening IGVp1 of the IGV, the pressure difference between the pressure at the second bleed position Pb2 of the compressor 10 and the pressure around the second-row vanes 54b is large as described above. On the other hand, when the intake temperature Ti is low, the pressure difference between the pressure at the second bleed position Pb2 of the compressor 10 and the pressure around the second-row varies 54b is small. For this reason, when the gas turbine output is high and the intake temperature Ti is low, a flow rate necessary for the vane cooling air As to serve as the sealing air cannot be secured using a flow rate at which the low pressure compressed air A2 bled from the second bleed position Pb2 is supplied as the vane cooling air As to the second-row vanes 54b via only the low pressure bleed line 64 in some cases.

Thus, in this embodiment, when the gas turbine output is high and the intake temperature Ti is low, as shown in the section, in FIG. 8 representing the case where the gas turbine output is high and the intake temperature Ti is low, the first valve 67 is basically completely closed and the second valve 69 is slightly opened in accordance with the intake temperature Ti. Here, also when the gas turbine output is high and the intake temperature Ti is low, the first valve 67 is opened and the second valve 69 is further opened when the disc cavity temperature Td has become equal to or higher than the first limit temperature Td1.

When the intake temperature Ti is high, a temperature of the low pressure compressed air A2 bled from the second bleed position Pb2 is higher than the temperature thereof when the intake temperature Ti is low. However, when the gas turbine output is low, even when the intake temperature Ti is high, the temperature of the low pressure compressed air A2 bled from the second bleed position Pb2 is lower than the temperature thereof when the gas turbine output is high and the intake temperature Ti is high. Thus, if the low pressure compressed air A2 from the second bleed position Pb2 is supplied as the vane cooling air As to the second-row vanes 54b, the second-row vanes 54b can basically be cooled to a target temperature or less, and thus the high pressure compressed air A1 cooled by the cooler 62 need not be sent to the low pressure bleed line 64.

Also, when the intake temperature Ti is high, as described above, the pressure difference between the pressure at the second bleed position Pb2 of the compressor 10 and the pressure around the second-row vanes 54b is large. For this reason, when the intake temperature Ti is high, a flow rate necessary for the vane cooling air As to serve as the sealing air can be secured using a flow rate at which the low pressure compressed air A2 bled from the second bleed position Pb2 is supplied as the vane cooling air As to the second-row vanes 54b via only the low pressure bleed line 64.

Thus, in this embodiment, when the gas turbine output is low and the intake temperature Ti is high, the first valve 67 and the second valve 69 are basically completely closed as shown in the section in FIG. 8 representing the case where the gas turbine output is low and the intake temperature Ti is high.

The temperature of the low pressure compressed air A2 bled from the second bleed position Pb2 when the gas turbine output is high and the intake temperature Ti is high is higher than the temperature thereof of any of when the gas turbine output is high and the intake temperature Ti is low, when the gas turbine output is low and the intake temperature Ti is high, and when the gas turbine output is low and the intake temperature Ti is low. Furthermore, when the gas turbine output is high and the intake temperature Ti is high, a flow rate necessary for the vane cooling air As to serve as the sealing air can be secured using a flow rate at which the low pressure compressed air A2 bled from the second bleed position Pb2 is supplied as the vane cooling air As to the second-row vanes 54b via only the low pressure bleed line 64.

Thus, in this embodiment, when the gas turbine output is high and the intake temperature Ti is high, basically the first valve 67 is opened and the second valve 69 is closed completely as shown in the section in FIG. 8 representing the case where the gas turbine output is high and the intake temperature Ti is high. Here, when the gas turbine output is high and the intake temperature Ti is high, if the disc cavity temperature Td has become equal to or higher than the first limit temperature Td1, the first valve 67 is further opened and the second valve 69 is opened.

Also, in any of the four forms shown in FIG. 8, the first control unit 130 controls the degree of valve opening V1p of the first valve 67 in accordance with a deviation between the temperature Tc of the vane cooling air As detected by the cooling air thermometer 72 and a target temperature of the vane cooling air As. For this reason, in any of the four forms shown in FIG. 8, the degree of valve opening V1p of the first valve 67 is larger than the degree of valve opening V1p of the first valve 67 exemplified in FIG. 8 in some cases.

As described above, in this embodiment, since the degree of valve opening V1p of the first valve 67 in the connecting line 66 and the degree of valve opening V2p of the second valve 69 in the bypass line 68 are adjusted, the temperature and the flow rate of the vane cooling air As supplied to the second-row vanes 54b can be controlled. Moreover, in this embodiment, the high pressure compressed air A1 bled from the first bleed position Pb1 and cooled by the cooler 62 flows into the low pressure bleed line 64 via the connecting line 66, so that the temperature of the second-row vanes 54b can be suppressed to a target temperature or less without providing a cooler in the low pressure bleed line 64.

Also, in this embodiment, even when both of the first valve 67 and the second valve 69 tail in a closed state, the low pressure compressed air A2 from the second bleed position Pb2 can be supplied as the vane cooling air As to the second-row vanes 54b via the orifice 65 in the low pressure bleed line 64. For this reason, in this embodiment, even when both of the first valve 67 and the second valve 69 fail in the closed state, the second-row vanes 54b can be prevented from being immediately damaged due to beat. Moreover, in this embodiment, even when both of the first valve 67 and the second valve 69 fail in the closed state, since the flow rate of the low pressure compressed air A2 flowing through, the low pressure bleed line 64 is limited by the orifice 65, an increase in the amount of bleeding from the compressor 10 can be minimized, and thus a decrease in the gas turbine output can be minimized.

As described above, in this embodiment, the vane cooling air As can be appropriately supplied to the second-row vanes 54b that are the second hot parts.

Note that, in this embodiment, the orifice is exemplified as a minimum flow rate securing device that secures a minimum flow rate of air flowing through the low pressure bleed line 64 while limiting a flow rate of the low pressure compressed air A2 flowing through the low pressure bleed line 64. However, other than the orifice, a device and the like with flow path throttling such as a flow nozzle and a venturi tube, and a valve and the like with a mechanism which secures a minimum flow rate can also be used as the minimum flow rate securing device. A mechanism for mechanically preventing the completely closed state, a mechanism in which a hole is provided in advance in a member configured to close a flow path, and the like can be used as the mechanism which secures a minimum flow rate.

Second Embodiment

A second embodiment of gas turbine equipment according to the present invention will be described with reference to FIGS. 10 to 12.

Figure 10:
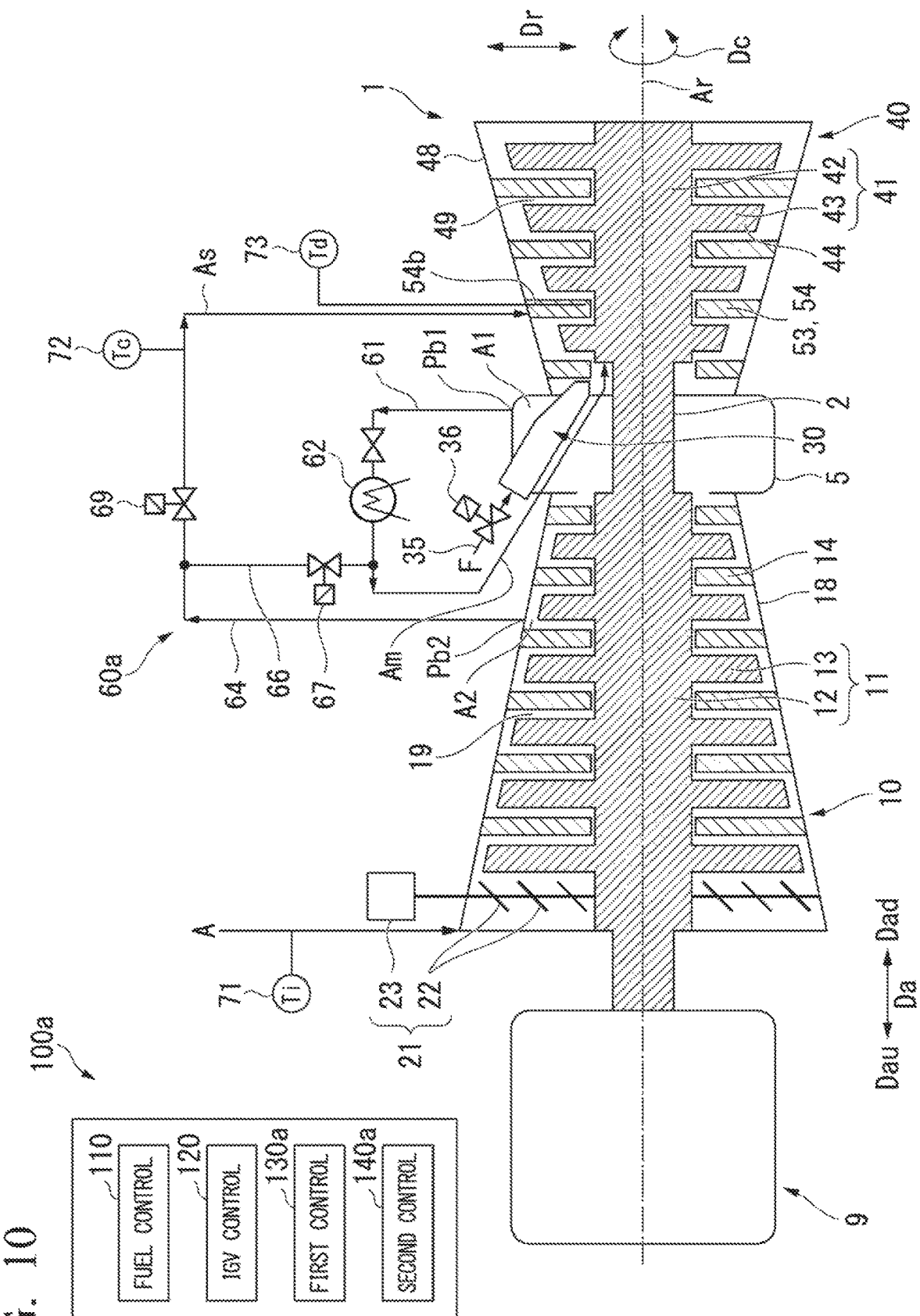
FIG. 10 is a schematic diagram showing an overall constitution of gas turbine equipment in a second embodiment according to the present invention.

The gas turbine equipment in this embodiment, like the gas turbine equipment in the first embodiment, includes a gas turbine 1, a cooling system 60a configured to cool parts constituting the gas turbine 1, and a control device 100a as shown in FIG. 10. The gas turbine 1 in this embodiment is basically the same as the gas turbine 1 in the first embodiment. On the other hand, the cooling system 60a in this embodiment is somewhat different from the cooling system 60 in the first embodiment. Furthermore, the control device 100a in this embodiment is also somewhat different from the control device 100 in the first embodiment. Thus, hereinafter, the cooling system 60a and the control, device 100a in this embodiment wilt be mainly described.

The cooling system 60a in this embodiment, like the cooling system 60 in the first embodiment, includes a high pressure bleed line 61, a cooler 62, a low pressure bleed line 64, a connecting line 66, a first valve 67, a second valve 69, an intake thermometer 71, a cooling air thermometer 72, a disc cavity thermometer 73, a first control unit 130a, and a second control unit 140a. Here, the cooling system 60a in this embodiment does not include the orifice 65 and the bypass line 68 in the cooling system 60 in the first embodiment. For this reason, the second valve 69 is provided in the low pressure bleed line 64. To be specific, the second valve 69 is provided in the low pressure bleed line 64 between a position of connection with the connecting line 66 and the cooling air thermometer 72. Note that the cooling air thermometer 72 is provided in the low pressure bleed line 64 between the position of connection with the connecting line 66 and the second-row vanes 54b.

The first control unit 130a controls a degree of value opening of the first valve 67. The second control unit 140a controls a degree of valve opening of the second valve 69. The first control unit 130a and the second control unit 140a In this embodiment also serve as a pan of a functional constitution of the control device 100a. The control device 100a, like the control device 100 in the first embodiment, includes a fuel control unit 110 and an IGV control unit 120 in addition to the first control unit 130a and the second control unit 140a.

Like in the first embodiment, a high pressure bleeding step (S1), a cooling step (S2), a low pressure bleeding step (S3), a first control step (S4), a mixing step (S5), and a second control step (S6) are also performed in this embodiment. Here, in this embodiment, an operation of the first control unit 130a In the first control step (S4) and an operation of the second control unit 140a in the second control step (S6) are somewhat different from those of the first embodiment.

Like in the first embodiment, when the first valve 67 in the cooling system 60a is opened in the first control step (S1), high pressure compressed air A1 bled from a first bleed position Pb1 of a compressor 10 and cooled by the cooler 62 flows into the low pressure bleed line 64 via the connecting line 66 and is mixed with low pressure compressed air A2 in the low pressure bleed line 64.

As described above with reference to FIG. 7, a pressure difference ΔP between a pressure at a second bleed position Pb2 and a pressure at a position Pc2 of second-row vanes 54b when a gas turbine output is low is smaller than the pressure difference ΔP when the gas turbine output is high. For this reason, the flow rate at which the low pressure compressed air A2 bled from the second bleed position Pb2 of the compressor 10 is supplied as vane cooling air As to the second-row vanes 54b via the low pressure bleed line 64 when the gas turbine output is low is lower than the flow rate thereof when the gas turbine output is high.

Thus, in the first control step (S1), when a gas turbine output Po is low, high pressure compressed air A1 which is cooled by the cooler 62 is mixed into the low pressure compressed air A2. As a result, a pressure of the vane cooling air As (parts inflow air) obtained by mixing the high pressure compressed air A1 into the low pressure compressed air A2 increases, and thus a decrease in the flow rate of the vane cooling air As (the parts inflow air) when the gas turbine output Po is low can be minimized.

Figure 11:
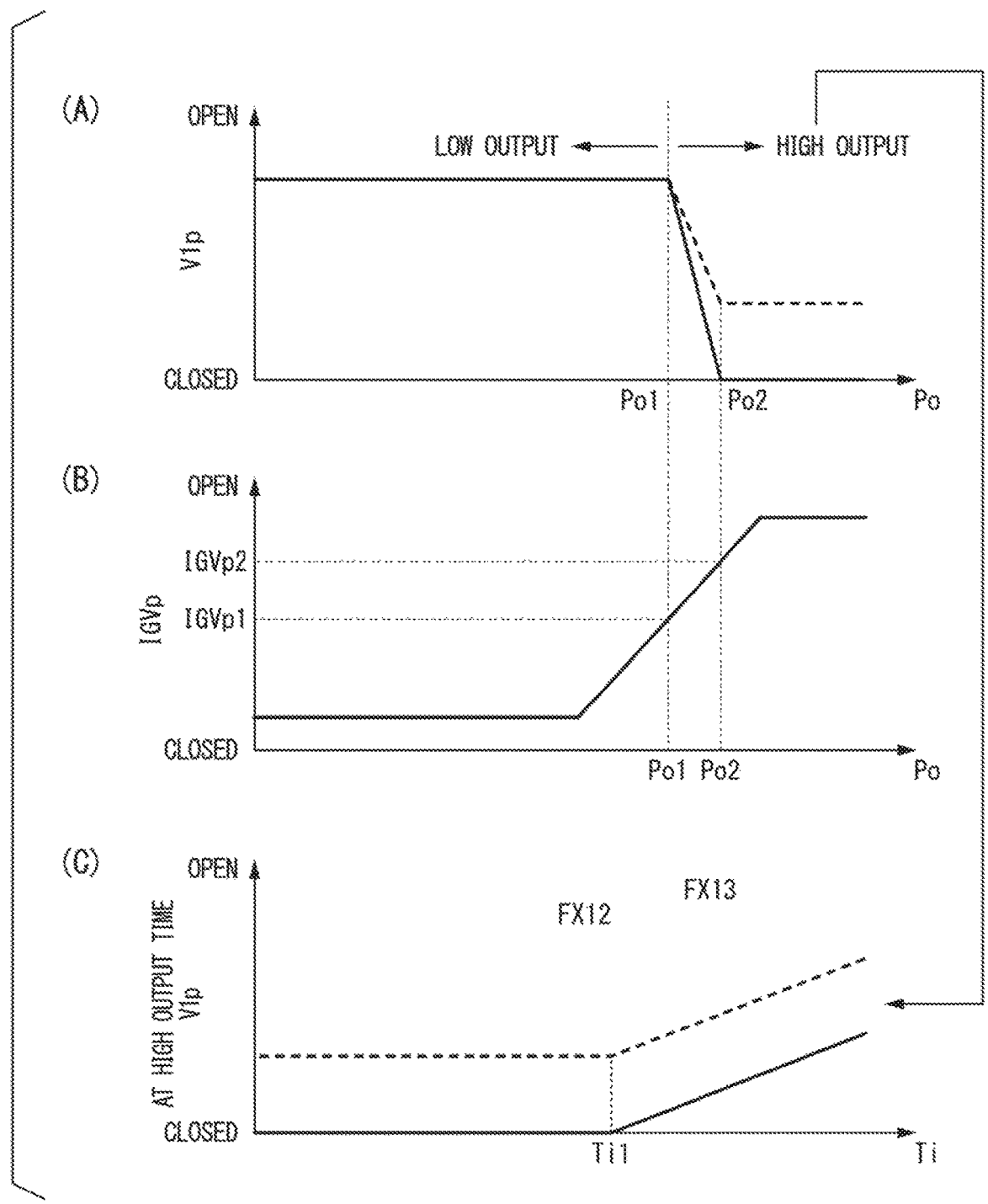
FIG. 11 shows relationships among a degree of valve opening of a first valve, a degree of opening of an IGV, a gas turbine output, and an intake temperature in the second embodiment according to the present invention.

As shown in FIG. 11 (A) and FIG. 5 (B), the first control unit 130a determines a degree of valve opening which is a completely closed state or is close to a completely closed state as a degree of valve opening V1p of the first valve 67, at a high output time when a degree of opening IGVp of an IGV that is a correlation value of the gas turbine output Po is equal to or greater than a second degree of opening IGVp2 of the IGV (a gas turbine output Po2). The first control unit 130a determines a degree of valve opening which is open as the degree of valve opening V1p of the first valve 67, when the degree of opening IGVp of the IGV has become smaller than the second degree of opening IGVp2 of the IGV (the gas turbine output Po2). To be more specific, when the degree of opening IGVp of the IGV is within a range from the second degree of opening IGVp2 of the IGV (the gas turbine output Po2) to the first degree of opening IGVp1 of the IGV (the gas turbine output V1p or greater, the first control unit 130a determines, as the degree of valve opening V1p of the first valve 67, a degree of valve opening which gradually decreases as the degree of opening IGVp of the IGV increases. In other words, within this range, the first control unit 130a determines the degree of valve opening which gradually decreases as the degree of opening IGVp of the IGV increases as the degree of valve opening V1p of the first valve 67 furthermore, the first control unit 130a determines a degree of valve opening at the first degree of opening IGVp1 of the IGV of the degree of opening IGVp of the IGV as the degree of valve opening V1p of the first valve 67, when the degree of opening IGVp of the IGV has become smaller than the first degree of opening IGVp1 of the IGV. In other words, when the gas turbine output Po is low, the first control unit 130a determines a degree of valve opening larger than the degree of valve opening at the high output time as the degree of valve opening V1p of the first valve 67.

Here, the first control unit 130a corrects the degree of valve opening V1p of the first valve 67 determined as described above in accordance with an intake temperature Ti at the high output time. To be specific, like in the first embodiment, the first control unit 130a acquires such a correction factor that the degree of valve opening V1p of the first valve 67 increases along with the increase of the intake temperature Ti, when the intake temperature Ti has become equal to or higher than a predetermined first intake temperature Ti1 at the high output time, as indicated by a solid line in FIG. 11 (C). The first control unit 130a multiplies the degree of valve opening V1p of the first valve 67 determined as described above by the correction factor and corrects the degree of valve opening V1p.

In other words, like in the first embodiment, when the intake temperature Ti has become high, the first control unit 130a in this embodiment also corrects the degree of valve opening V1p of the first valve 67 determined as described above so that the degree of valve opening V1p increases.

When a disc cavity temperature Td has become equal to or higher than a first limit temperature Td1 at the high output lime, as indicated by a broken line in FIG. 11 (A), when the degree of opening IGVp of the IGV is within a range from the first degree of opening IGVp1 of the IGV to the second degree of opening IGVp2 of the IGV or less, the first control unit 130a determines, as the degree of valve opening V1p of the first valve 67, a degree of valve opening which gradually decreases as the degree of opening IGVp of the IGV increases and is larger than a degree of valve opening within the same range at the disc cavity temperature Td less than the first limit temperature Td1. Furthermore, when the disc cavity temperature Td has become equal to or higher than the first limit temperature Td1 and the degree of opening IGVp of the IGV has become larger than the second degree of opening IGVp2 of the IGV at the high output time, the first control unit 130a determines, as the degree of valve opening V1p of the first valve 67, a degree of valve opening which is a constant degree of valve opening and is larger than a degree of valve opening within the same range at the disc cavity temperature Td less than the first limit temperature Td1.

Here, also when the disc cavity temperature Td has become equal to or higher than the first limit temperature Td1 at the high output time, the first control unit 130a corrects the degree of valve opening V1p of the first valve 67 determined as described above in accordance with the intake temperature Ti. To be specific, when the disc cavity temperature Td is equal to or higher than the first limit temperature Td1 and the intake temperature Ti is less than the predetermined first intake temperature Ti1 at the high output time, as indicated by a broken line in FIG. 11 (C), the first control unit 130a acquires a constant correction factor with respect to the intake temperature Ti. The first control unit 130a multiplies the degree of valve opening V1p of the first valve 67 determined as described above by the correction factor and corrects the degree of valve opening V1p. In addition, the first control unit 130a acquires such a correction factor that the degree of valve opening V1p of the first valve 67 increases along with an increase of the intake temperature Ti from the above-described constant degree of valve-opening V1p, when the intake temperature Ti is equal to or higher than the predetermined first intake temperature Ti1. The first control unit 130a multiplies the degree of valve opening V1p of the first valve 67 determined as described above by the correction factor and corrects the degree of valve opening V1p.

Like in the first embodiment, the first control unit 130a acquires an amount of change in the degree of valve opening of the first valve 67 so that a temperature of the vane cooling air As in the low pressure bleed line 64 detected by the cooling air thermometer 72 reaches a target temperature. The first control unit 130a acquires a deviation between a temperature Tc of the vane cooling air As detected by the cooling air thermometer 72 and a target temperature of the vane cooling air As. The first control unit 130a acquires an amount of PI control that is the amount of change in the degree of opening of the first valve 67 according to the deviation.

The first control unit 130a adds the amount of change in the degree of opening of the first valve 67 according to the deviation between the temperature Tc of the vane cooling air As detected by the cooling air thermometer 72 and the target temperature of the vane cooling air As, to the degree of valve opening V1p of the first valve 67 determined as described above, and sets the result as the target degree of valve opening V1p of the first valve 67. The first control unit 130a creates a control signal according to the target degree of valve opening V1p and outputs the control signal to the first valve 67.

Thus, the vane cooling air As at a flow rate appropriate for serving as sealing air and at a temperature appropriate for cooling the second-row vanes 54b can be basically sent to the second-row vanes 54b through control of the degree of valve opening V1p of the first valve 67 using the first control unit 130a.

When the gas turbine output Po is low, the first control unit 130a in this embodiment determines the degree of valve opening larger than the degree of valve opening when the gas turbine output Po is high as the degree of valve opening V1p of the first valve 67. Conversely, when the gas turbine output Po is high, the first control unit 130 in the first embodiment determines the degree of valve opening larger than the degree of valve opening when the gas turbine output Po is low as the degree of valve opening V1p of the first valve 67.

In this way, methods of controlling the first valve 67 in this embodiment and the first embodiment are different in that the types of gas turbines 1 are different. For example, the gas turbine 1 includes types of gas turbines in which cooling conditions of hot parts are strict and conditions of sealing air are not strict as well as types of gas turbines in which cooling conditions of hot parts are not strict and conditions of sealing air are strict. Here, the fact that "cooling conditions of hot parts are strict and conditions of sealing air are not strict" means that, even if air at a flow rate appropriate for serving as sealing air is sent to hot parts, cooling of the hot parts by such air is insufficient in many cases. Furthermore, the fact that "cooling conditions of hot parts are not strict and conditions of sealing air are strict" means that, even if air at an appropriate temperature to cool hot parts is sent to the hot parts, the flow rate of such air is insufficient as sealing air in many cases.

The control device 100a in this embodiment can be applied to the gas turbine 1 of the type in which cooling conditions of hot parts are not strict and conditions of sealing air are strict. Thus, the first control unit 130a in this embodiment increases the degree of valve opening V1p of the first valve 67 when the gas turbine output Po is low and the flow rate of the vane cooling air As (the parts inflow air) decreases.

On the other hand, the control device 100 in the first embodiment can be applied to the gas turbine 1 of the type in which cooling conditions of hot parts are strict and conditions of sealing air are not strict. Thus, the first control unit 130 in the first embodiment increases the degree of valve opening V1p of the first valve 67 when a gas turbine output Po is high and a temperature of a combustion gas is high.

For this reason, when the control device 100a in this embodiment is a device concerning the gas turbine 1 of the type in which cooling conditions of hot parts are not strict and conditions of sealing air are strict, the first control unit 130a in this embodiment, like the first control unit 130 in the first embodiment, may increase the degree of valve opening V1p of the first valve 67 when the gas turbine output Po is high.

Also, when the control device 100 in the first embodiment is a device concerning the gas turbine 1 of the type in which cooling conditions of hot parts are strict and conditions of sealing air are not strict, the first control unit 130 in the first embodiment, like the first control unit 130a of this, embodiment, may increase the degree of valve opening V1p of the first valve 67 when the gas turbine output Po is low.

The low pressure compressed air A2 bled from the second bleed position Pb2 of the compressor 10 is supplied as the vane cooling air As to the second-row vanes 54b via the low pressure bleed line 64. The flow rate of the vane cooling air As supplied to the second-row vanes 54b can be increased by increasing the degree of valve opening of the second valve 69 provided in the low pressure bleed line 64. For this reason, when the flow rate of the vane cooling air As is to be increased, the second valve 69 is also opened in this embodiment.

Figure 12:
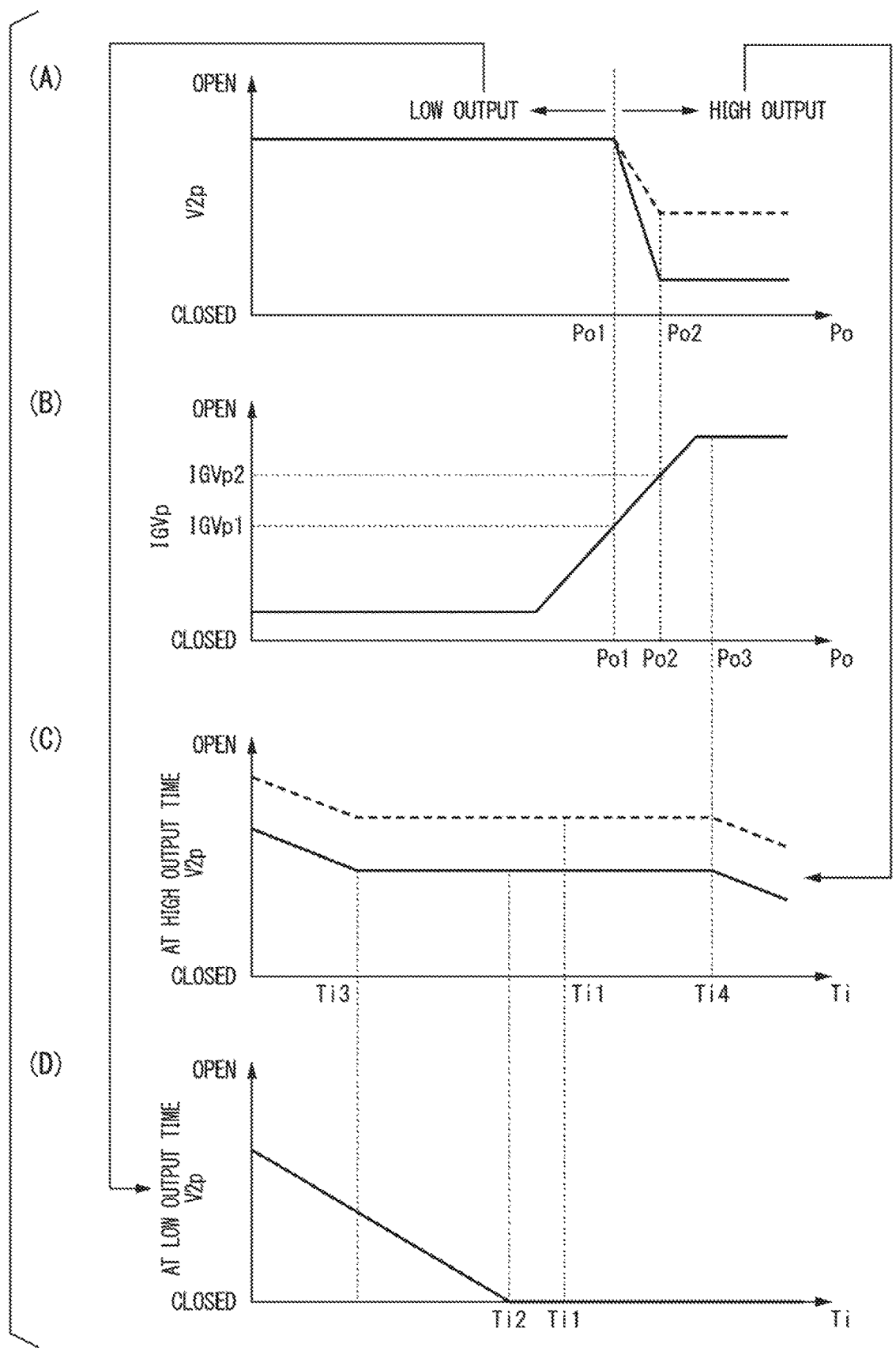
FIG. 12 shows relationships among a degree of valve opening of a second valve, the degree of opening of the IGV, the gas turbine output, and the intake temperature in the second embodiment according to the present invention.

Thus, in the second control step (S6), as shown in FIG. 12 (A) and FIG. 12 (B), the second control unit 140a determines a degree of valve opening which is open as a degree of valve opening V2p of the second valve 69, at a low output time when the degree of opening IGVp of the IGV that is a correlation value of the gas turbine output Po is equal to or less than the first degree of opening IGVp1 of the IGV. Furthermore, the second control unit 140a determines, as the degree of valve opening V2p of the second valve 69, the degree of valve opening V2p which is smaller than the degree of valve opening V2p at the low output time and gradually decreases as the degree of opening IGVp of the IGV increases, at the high output time when the degree of opening IGVp of the IGV is larger than the first degree of opening IGVp1 of the IGV and is equal to or less than the second degree of opening IGVp2 of the IGV. The second control unit 140a determines a degree of valve opening at the second degree of opening IGVp2 of the IGV of the degree of opening IGVp of the IGV, at the high output time when the degree of opening IGVp of the IGV is larger than the second degree of opening IGVp2 of the IGV.

Here, the second control unit 140a also corrects the degree of valve opening V2p of the second valve 69 determined as described above in accordance with the intake temperature Ti. To be specific, at the low output time, as shown in FIG. 12 (D), the second control unit 140a acquires a correction factor indicating the completely closed state, when the intake temperature Ti is higher than a second intake temperature Ti2, which is lower than the first intake temperature Ti1. Moreover, the second control unit 140a multiplies the degree of valve opening V2p of the second valve 69 determined as described above by the correction factor and corrects the degree of valve opening V2p. The second control unit 140a acquires such a correction factor that the degree of valve opening V2p gradually increases along with a decrease of the intake temperature Ti, when the intake temperature Ti has become equal to or lower than the second intake temperature Ti2 at the low output time. The second control unit 140a multiplies the degree of valve opening V2p of the second valve 69 determined as described above by the correction factor and corrects the degree of valve opening V2p.

The second control unit 140a acquires a correction factor indicating a constant degree of valve opening which is open, while the intake temperature Ti is between a third intake temperature Ti3 and a fourth intake temperature Ti4 at the high output time as indicated by a solid line in FIG. 12 (C). Moreover, the second control unit 140a multiplies the degree of valve opening V2p of the second valve 69 determined as described above by the correction factor and corrects the degree of valve opening V2p. Here, the third intake temperature Ti3 is a temperature lower than the second intake temperature Ti2. The fourth intake temperature Ti4 is a temperature higher than the second intake temperature Ti1 and the first intake temperature Ti1. The second control unit 140a acquires such a correction factor that the degree of valve opening V2p gradually increases along with the decrease of the intake temperature Ti, when the intake temperature Ti has become equal to or lower than the third intake temperature Ti3 at the high output time.

Moreover, the second control unit 140a multiplies the degree of valve opening V2p of the second valve 69 determined as described above by the correction factor and corrects the degree of valve opening V2p. The second control unit 140a acquires such a correction factor that the degree of valve opening V2p gradually decreases along with the increase of the intake temperature Ti when the intake temperature Ti has become higher than the fourth intake temperature Ti4 at the high output time. The second control unit 140a multiplies the degree of valve opening V1p of the second valve 69 determined as described above by the correction factor and corrects the degree of valve opening V1p.

In other words, the second control unit 140a corrects the degree of valve opening V2p of the second valve 69 determined as described above so that the degree of valve opening V1p increases, when the intake temperature Ti decreases both at the high output time and the low output time.

The second control unit 140 in the first embodiment acquires a correction factor indicating a constant degree of valve opening which is open, in an overall temperature range in which the intake temperature Ti is higher than the third intake temperature Ti3 at the high output time its shown in FIG. 6 (C). Moreover, the second control unit 140 multiplies the degree of valve opening V1p of the second valve 69 determined as described above by the correction factor. On the other hand, the second control unit 140a in this embodiment acquires such a correction factor that the degree of valve opening V2p gradually decreases along with the increase of the intake temperature Ti, when the intake temperature Ti has become higher than the fourth intake temperature Ti4, which is higher than the third intake temperature Ti3, at the high output time as described above with reference to FIG. 12 (C). The second control unit 140a multiplies the degree of valve opening V2p of the second valve 69 determined as described above by the correction factor.

Gas turbine efficiency in the gas turbine 1 increases as the flow rate of air bled from the compressor 10 decreases. For this reason, in this embodiment, to increase the gas turbine efficiency close to a limit thereof while suppressing burning or the like of hot parts, the degree of valve opening V2p of the second valve 69 is corrected as described above when the intake temperature Ti has become higher than the fourth intake temperature Ti4 at the high output time. Note that such correction is preferably performed on the gas turbine 1 of the type in which cooling conditions of hot parts are not strict.

When the disc cavity temperature Td has become higher than the first limit temperature Td1 at the high output time, as indicated by a broken line in FIG. 12 (A), when the degree of opening IGVp of the IGV is within a range from the first degree of opening IGVp1 of the IGV to the second degree of opening IGVp2 of the IGV or less, the second control unit 140a determines, as the degree of valve opening V2p of the second valve 69, the degree of valve opening V2p which decreases as the degree of opening IGVp of the IGV increases and is larger than the degree of valve opening V2p within the same range at the disc cavity temperature Td less than the first limit temperature Td1. Furthermore, when the disc cavity temperature Td has become equal to or higher than the first limit temperature Td1 and the degree of opening IGVp of the IGV has become larger than the second degree of opening IGVp2 of the IGV at the high output time, the second control unit 140a determines, as the degree of valve opening V2p of the second valve 69, the degree of valve opening V2p which is a constant degree of valve opening and is larger than the degree of valve opening V2p within the same range at the disc cavity Td less than the first limit temperature Td1.

Here, the second control unit 140a corrects the degree of valve opening V2p of the second valve 69 determined as described above in accordance with the intake temperature Ti, also when the disc cavity temperature Td has become equal to or higher than the first limit temperature Td1 at the high output time. To be specific, the second control unit 140a acquires a correction factor indicating a constant degree of valve opening larger than a degree of valve opening at the disc cavity temperature Td less than the first limit temperature Td1, while the disc cavity temperature Td is equal to or higher than the first limit temperature Td1 and the intake temperature Ti is between the third intake temperature Ti3 and the fourth intake temperature Ti4 at the high output time. Moreover, the second control unit 140a multiplies the degree of valve opening V2p of the second valve 69 determined as described above by the correction factor and corrects the degree of valve opening V2p, The second control unit 140a acquires such a correction factor that the degree of valve opening V2p of the second valve 69 increases along with the decrease of the intake temperature Ti from the above-described constant degree of valve opening V2p, when the disc cavity temperature Td is equal to or higher than the first limit temperature Td1 and the intake temperature Ti is equal to or lower than the third intake temperature Ti3 at the high output time. The second control unit 140a multiplies the degree of valve opening V2p of the second valve 69 determined as described above by the correction factor and corrects the degree of valve opening V2p. The second control unit 140a acquires such a correction factor that the degree of valve opening V2p gradually decreases along with the increase of the intake temperature Ti from the above-described constant degree of valve opening V2p when the intake temperature Ti has become higher than the fourth intake temperature Ti4 at the high output time. The second control unit 140a multiplies the degree of valve opening V2p of the second valve 69 determined as described above by the correction factor and corrects the degree of valve opening V2p.

As described above, the vane cooling air As can be appropriately supplied to the second-row vanes 54b that are the second hot parts in this embodiment as well.

Modified Examples

In the above-described embodiments, the degree of opening IGVp of the IGV acquired by the IGV control unit 120 is used as an output correlation value correlated with a gas turbine output. However, an opening degree detector configured to detect a degree of opening of the movable vanes 22 in the IGV 21 may be provided so that the degree of opening IGVp of the IGV detected by the opening degree detector is used as the output correlation value.

In the above-described embodiments, the degree of opening IGVp of the IGV is used as an output correlation value correlated with a gas turbine output. However, any parameters which have correlation with the gas turbine output may be used, and a gas turbine output itself may be the output correlation value.

In the above-described embodiments, the first bleed position Pb1 is the position of the portion in the compressor casing 18 at which the combustor 30 is accommodated and the second bleed position Pb2 is the position of the intermediate stage in the compressor casing 18. However, provided that a pressure of air bled from the first bleed position Pb1 is high relative to a pressure of air bled from the second bleed position Pb2, the bleed positions are not limited to the above-described positions.

In the above-described embodiments, the first hot parts are constituted of the first-row blades 44a and the second hot parts are constituted of the second-row vanes 54b. However, provided that the second hot parts are hot parts disposed under an environment at a lower pressure than the first hot pans, the hot parts are not limited to the above-described parts. For example, the first hot parts may be the combustion liner 31 in the combustor 30.

INDUSTRIAL APPLICABILITY

According to an aspect according to the present invention, cooling air can be appropriately supplied to hot parts.

REFERENCE SIGNS LIST

1 Gas turbine
2 Gas turbine rotor
5 Gas turbine easing
9 Electric power generator
10 Compressor
11 Compressor rotor
12 Rotor shaft
13 Blade row
14 Vane row
18 Compressor casing
19 Air compression flow path
30 Combustor
40 Turbine
41 Turbine rotor
42 Rotor shaft
43 Blade row
44 Blade
44a First-row blade (first hot part)
48 Turbine casing
49 Combustion gas flow path
53 Vane row
54 Vane
54b Second-row vane (second hot part)
59 Disc cavity
60, 60a Cooling system
61 High pressure bleed line
62 Cooler
64 Low pressure bleed line
65 Orifice (minimum flow rate seeming device)
66 Connecting line
67 First valve
68 Bypass line
69 Second valve
71 Intake thermometer
72 Cooling air thermometer
73 Disc cavity thermometer
100, 100a Control device
110 Fuel control unit
120 IGV control unit
130, 131a First control unit
140, 140a Second control unit

The invention claimed is:
1. A method for cooling parts of a gas turbine, the gas turbine including a compressor configured to compress air, a combustor configured to burn a fuel in the air compressed by the compressor and to generate a combustion gas, and a turbine driven using the combustion gas, the method comprising:
- a high pressure bleeding step of bleeding air from a first bleed position of the compressor as first air and sending the first air via a high pressure bleed line to a first hot part of the gas turbine which is in contact with the combustion gas the high pressure bleed line having a first end and a second end, the first end of the high pressure bleed line configured to connect to, and bleed the first air from, the first bleed position of the compressor, the second end of the high pressure bleed line being configured to connect to the first hot part;
- a cooling step of cooling, using a cooler, the first air sent to the first hot part in the high pressure bleeding step;
- a low pressure bleeding step of bleeding second air at a pressure lower than that of the first air from a second bleed position of the compressor and sending the second air via a low pressure bleed line to a second hot part of the gas turbine without passing through a cooler, the second hot part in contact with the combustion gas and disposed under a lower pressure environment than the first hot part;
- a mixing step of mixing the first air cooled in the cooling step into the second air sent to the second hot part;
- a first control step of using a first control unit to control a degree of valve opening of a first valve to control a flow rate of the first air mixed into the second air, the first valve being provided on a connecting line, the connecting line configured to connect together (1) a first position in the high pressure bleed line between the second end of the high pressure bleed line and the cooler and (2) the low pressure bleed line; and
- a second control step of using a second control unit to control a degree of valve opening of a second valve to control a flow rate of parts inflow air, the parts inflow air being a mixture of the first air and the second air, the flow rate of the first air being controlled in the first control step, the second valve being provided at a second position in the high pressure bleed line between the first end of the high pressure bleed line and the cooler, wherein, in the first control step, the flow rate of the first air to be mixed into the second air is controlled by the first control unit based on at least one of (1) an intake temperature that is a temperature of air suctioned by the compressor or (2) an output correlation value that is either a gas turbine output or a value correlated with the gas turbine output, and in the second control step, the flow rate of the parts inflow air is controlled by the second control unit based on the at least one of the intake temperature or the output correlation value.

2. The method according to claim 1, wherein the at least one of the intake temperature or the output correlation value includes the intake temperature, and wherein in the first control step, when the intake temperature is equal to or higher than a predetermined intake temperature, a control signal is output by the first control unit to the first valve to set the degree of valve opening of the first valve to be equal to or greater than the degree of valve opening of the first valve at a value of the intake temperature which is smaller than the predetermined intake temperature.

3. The method according to claim 2, wherein the at least one of the intake temperature or the output correlation value includes the output correlation value, and wherein in the first control step, when the output correlation value is equal to or greater than a predetermined correlation value, a control signal is output by the first control unit to the first valve to set the degree of valve opening of the first valve to be equal to or greater than the degree of valve opening of the first valve at a value of the output correlation value which is smaller than the predetermined correlation value.

4. The method according to claim 2, wherein the at least one of the intake temperature or the output correlation value includes the output correlation value, and wherein in the first control step, when the output correlation value is equal to or less than a predetermined correlation value, a control signal is output by the first control unit to the first valve to set the degree of valve opening of the first valve to be equal to or greater than the degree of valve opening of the first valve at a value of the output correlation value which is larger than the predetermined correlation value.

5. The method according to claim 2, wherein the at least one of the intake temperature or the output correlation value includes the output correlation value, and wherein in the second control step, when the output correlation value is equal to or less than a predetermined correlation value, a control signal is output by the second control unit to the second valve to set the degree of valve opening of the second valve to be equal to or greater than the degree of valve opening of the second valve at a value of the output correlation value which is larger than the predetermined correlation value.

6. The method according to claim 2, wherein the at least one of the intake temperature or the output correlation value includes the intake temperature, and wherein in the second control step, when the intake temperature is equal to or lower than the predetermined intake temperature, a control signal is output by the second control unit to the second valve to set the degree of valve opening of the second valve to be equal to or greater than the degree of valve opening of the second valve at a value of the intake temperature which is larger than the predetermined intake temperature.

7. The method according to claim 6, wherein, in the second control step, when the intake temperature has reached a temperature between the predetermined intake temperature and a second temperature which is higher than the predetermined intake temperature, a control signal is output by the second control unit to the second valve to set a constant degree of valve opening, and when the intake temperature is equal to or higher than the second temperature, a control signal is output by the second control unit to the second valve to set the degree of valve opening of the second valve to be equal to or less than the degree of valve opening of the second valve at a value of the intake temperature which is smaller than the second temperature.

8. A cooling system for a gas turbine, the gas turbine including a compressor configured to compress air, a combustor configured to burn a fuel in the air compressed by the compressor to generate a combustion gas, and a turbine driven using the combustion gas, the cooling system for a gas turbine comprising:
- a high pressure bleed line having a first end and a second end, the first end of the high pressure bleed line configured to connect to, and bleed air from, a first bleed position of the compressor, the high pressure bleed line configured to direct the air bled from the first bleed position to a first hot part of the gas turbine which is in contact with the combustion gas, the second end of the high pressure bleed line being configured to connect to the first hot part;
- a cooler configured to cool air passing through the high pressure bleed line;

a low pressure bleed line configured to bleed air from a second bleed position of the compressor at a pressure lower than that of the air which is bled from the first bleed position, the low pressure bleed line configured to send the air bled from the second bleed position to a second hot part of the gas turbine which is in contact with the combustion gas and disposed under a lower pressure environment than the first hot part;

a connecting line configured to connect together (1) a first position in the high pressure bleed line between the second end of the high pressure bleed line and the cooler and (2) the low pressure bleed line;

a first valve provided in the connecting line;

a second valve provided at a second position in the high pressure bleed line between the first end of the high pressure bleed line and the cooler;

a first control unit configured to control a degree of valve opening of the first valve; and a second control unit configured to control a degree of valve opening of the second valve, wherein the first control unit is configured to control the degree of valve opening of the first valve based on at least one of (1) an intake temperature that is a temperature of air suctioned by the compressor or (2) an output correlation value that is either a gas turbine output or a value correlated with the gas turbine output, and wherein the second control unit is configured to control the degree of valve opening of the second valve based on the at least one of the intake temperature or the output correlation value.

9. The cooling system according to claim 8, wherein the low pressure bleed line is not provided with a cooler.

10. A cooling system for a gas turbine, the gas turbine including a compressor configured to compress air, a combustor configured to burn a fuel in the air compressed by the compressor to generate a combustion gas, and a turbine driven using the combustion gas, the cooling system comprising:

a high pressure bleed line having a first end and a second end, the first end of the high pressure bleed line configured to connect to, and bleed air from, a first bleed position of the compressor, the high pressure bleed line configured to direct the air bled from the first bleed position to a first hot part of the gas turbine which is in contact with the combustion gas, the second end of the high pressure bleed line being configured to connect to the first hot part;

a cooler configured to cool air passing through the high pressure bleed line;

a low pressure bleed line having a first end and a second end, the first end configured to connect to, and bleed air from, a second bleed position of the compressor at a pressure lower than that of the air which is bled from the first bleed position, the low pressure bleed line configured to send the air bled from the second bleed position to a second hot part of the gas turbine which is in contact with the combustion gas and disposed under a lower pressure environment than the first hot part, wherein the low pressure bleed line is not provided with a cooler, and wherein the second end of the low pressure bleed line is configured to connect to the second hot part;

a minimum flow rate securing device configured to secure a minimum flow rate of air flowing through the low pressure bleed line while limiting a flow rate of the air flowing through the low pressure bleed line;

a connecting line configured to connect together (1) a first position in the high pressure bleed line between the second end of the high pressure bleed line and the cooler and (2) a second position in the low pressure bleed line between the first end of the low pressure bleed line and the minimum flow rate securing device;

a first valve provided in the connecting line;

a bypass line configured to connect together (1) a third position in the connecting line between the second position in the low pressure bleed line and the first valve and (2) a fourth position in the low pressure bleed line between the second end of the low pressure bleed line and the minimum flow rate securing device; and a second valve provided in the bypass line.

11. The cooling system according to claim 10, further comprising:

a first control unit configured to control a degree of valve opening of the first valve; and a second control unit configured to control a degree of valve opening of the second valve, wherein the first control unit is configured to control the degree of valve opening of the first valve based on at least one of parameter value of (1) an intake temperature that is a temperature of air suctioned by the compressor or (2) an output correlation value that is either a gas turbine output or a value correlated with the gas turbine output, and wherein the second control unit is configured to control the degree of valve opening of the second valve based on the at least one of the intake temperature or the output correlation value.

12. The cooling system according to claim 11, wherein the first control unit is configured to control the degree of valve opening of the first valve based on the intake temperature such that when the intake temperature is equal to or higher than a predetermined intake temperature, the first control unit is configured to output, to the first valve, a control signal to set the degree of valve opening of the first valve to be equal to or greater than the degree of valve opening of the first valve at a value of the intake temperature which is smaller than the predetermined intake temperature.

13. The cooling system according to claim 12, wherein the first control unit is configured to receive a second temperature near the second hot part, the first control unit configured to, when the second temperature is equal to or higher than a predetermined second hot part temperature, output a control signal to increase the degree of valve opening of the first valve.

14. The cooling system according to claim 11, wherein the first control unit is configured to control the degree of valve opening of the first valve based on the output correlation value, the first control unit configured to, when the output correlation value is equal to or greater than a predetermined correlation value, output a control signal to the first valve to set the degree of valve opening of the first valve to be equal to or greater than the degree of valve opening of the first valve at a value of the output correlation value which is smaller than the predetermined correlation value.

15. The cooling system according to claim 11, wherein the first control unit is configured to control the degree of valve opening of the first valve based on the output correlation value, the first control unit configured to, when the output correlation value is equal to or less than a predetermined correlation value, output a control signal to the first valve to set the degree of valve opening of the first valve to be equal to or greater than the degree of valve opening of the first valve at a value of the output correlation value which is larger than the predetermined correlation value.

16. The cooling system according to claim 11, wherein the first control unit is configured to control the degree of valve opening of the first valve based on the intake temperature, the first control unit configured to, when the intake temperature is equal to or lower than a predetermined intake temperature, output a control signal to the second valve to set the degree of valve opening of the second valve to be equal to or greater than the degree of valve opening of the second valve at a value of the intake temperature which is larger than the predetermined intake temperature.

17. The cooling system according to claim 16, wherein the second control unit is further configured to, when the intake temperature is between the predetermined intake temperature and a second temperature which is higher than the predetermined intake temperature, output a control signal to the second valve to maintain a constant degree of valve opening of the second valve, the second control unit further configured to, when the intake temperature is equal to or higher than the second temperature, output a control signal to the second valve to set the degree of valve opening of the second valve to be equal to or less than the degree of valve opening of the second valve at a value of the intake temperature which is smaller than the second temperature.

18. The cooling system according to claim 11, wherein the second control unit is configured to control the degree of valve opening of the second valve based on the output correlation value, the second control unit being configured to, when the output correlation value is equal to or less than a predetermined correlation value, output a control signal to the second valve to set the degree of valve opening of the second valve to be equal to or greater than the degree of valve opening of the second valve at a value of the output correlation value which is larger than the predetermined correlation value.

19. The cooling system according to claim 10, wherein the low pressure bleed line is connected to a turbine vane, and wherein the second hot part is the turbine vane.

20. A gas turbine system comprising: the cooling system according to claim 10; and a gas turbine.

\* \* \* \* \*